(12) United States Patent
Wang et al.

(10) Patent No.: US 10,555,151 B2
(45) Date of Patent: Feb. 4, 2020

(54) METHOD FOR SUPPORTING NEGOTIATION SERVICE AT A SERVICE LAYER

(71) Applicant: Convida Wireless, LLC, Wilmington, DE (US)

(72) Inventors: Chonggang Wang, Princeton, NJ (US); Lijun Dong, San Diego, CA (US); Dale N. Seed, Allentown, PA (US); William Robert Flynn, IV, Schwenksville, PA (US); Guang Lu, Thornhill (CA); Hongkun Li, Malvern, PA (US); Qing Li, Princeton Junction, NJ (US); Xu Li, Plainsboro, NJ (US); Catalina M. Mladin, Hatboro, PA (US); Vinod Kumar Choyi, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 154 days.

(21) Appl. No.: 15/532,130

(22) PCT Filed: Dec. 1, 2015

(86) PCT No.: PCT/US2015/063164
§ 371 (c)(1),
(2) Date: Jun. 1, 2017

(87) PCT Pub. No.: WO2016/089854
PCT Pub. Date: Jun. 9, 2016

(65) Prior Publication Data
US 2017/0272894 A1    Sep. 21, 2017

Related U.S. Application Data

(60) Provisional application No. 62/086,102, filed on Dec. 1, 2014.

(51) Int. Cl.
*G06F 15/173* (2006.01)
*H04W 4/70* (2018.01)
(Continued)

(52) U.S. Cl.
CPC .............. *H04W 4/70* (2018.02); *G06Q 10/10* (2013.01); *H04L 41/0893* (2013.01); *H04L 41/5006* (2013.01); *H04L 67/2809* (2013.01)

(58) Field of Classification Search
USPC ......................................................... 709/223
See application file for complete search history.

(56) References Cited

U.S. PATENT DOCUMENTS 9,800,999 B2 * 10/2017 Ahn ......................... H04W 4/70
2002/0178103 A1 * 11/2002 Dan ........................ G06Q 40/00
705/37

(Continued)

FOREIGN PATENT DOCUMENTS

EP          2854423 A1 *  2/2012  ............. H04W 4/00
JP       2016-526207 A     9/2016
(Continued)

OTHER PUBLICATIONS

OneM2M—TS-0007, OneM2M Technical Specification, Service Component Architecture V0.3.0., Jun. 17, 2014, 105 pages.
(Continued)

*Primary Examiner* — Atta Khan
(74) *Attorney, Agent, or Firm* — BakerHostetler

(57) ABSTRACT

The present application is directed to a computer-implemented apparatus for negotiating service layer attributes. The apparatus includes a non-transitory memory including instructions stored thereon for a negotiation service layer for negotiating a service attributes. The apparatus also includes a processor, operably coupled to the non-transitory memory. The processor is configured to perform the instruction of reviewing a negotiable service layer attribute received from a negotiatee. The processor is also configured to perform the instruction of sending a negotiation request to the negotiatee based upon the reviewed attribute. The processor is also configured to perform the instruction of receiving an offered suggestion from the negotiatee. Another aspect of the appli- (Continued)

cation is directed to a networked system including a computer-implemented negotiatee and a computer-implemented negotiator for negotiating service layer attributes.

19 Claims, 17 Drawing Sheets

(51) Int. Cl.
*G06Q 10/10* (2012.01)
*H04L 29/08* (2006.01)
*H04L 12/24* (2006.01)

(56) References Cited

U.S. PATENT DOCUMENTS

2006/0053083 A1  3/2006  Wiest et al.
2012/0117140 A1* 5/2012  Wang ............... H04W 4/70
                                                 709/201
2014/0126581 A1* 5/2014  Wang ............... H04W 4/70
                                                 370/431
2016/0119434 A1* 4/2016  Dong ............... H04W 4/70
                                                 709/220

FOREIGN PATENT DOCUMENTS

KR   10-2012-0037009 A    4/2012
WO      2014/129802 A1    8/2014
WO      2014/182665 A2   11/2014

OTHER PUBLICATIONS

OneM2M—TS-0001, OneM2M Technical Specification, Functional Architecture, Aug. 1, 2014, 297 pages.

* cited by examiner

METHOD FOR SUPPORTING NEGOTIATION SERVICE AT A SERVICE LAYER

CROSS-REFERENCE TO RELATED APPLICATION

This application is a National Stage Application filed under 35 U.S.C. § 371 of International Application No. PCT/US2015/063164, filed Dec. 1, 2015, which claims priority to U.S. Provisional Application No. 62/086,102, filed Dec. 1, 2014, the disclosures of which are incorporated herein by reference in their entireties.

BACKGROUND

Machine-to-machine (M2M) technologies allow devices to communicate more directly with each other using wired and wireless communication systems. M2M technologies enable further realization of the Internet of Things (IoT), a system of uniquely identifiable objects and virtual representations of such objects that communicate with each other and over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

M2M service nodes and applications presently rely on static configurations or pre-provisioning to provide/access services from a M2M service layer. That is, there is inefficient support for dynamically requesting various features or functionalities of a specific service at different times. For example, existing oneM2M provides no mechanisms for a middle node (MN) common service entity (CSE) to dynamically request storage from an infrastructure node (IN)-CSE. Also, an IN-CSE has no service to manage the number of devices that an IN-application entity (AE) can manage and/or how frequently the IN-AE can issue requests to the IN-CSE.

The static configurations directly affect throughput. Namely, the flexibility of the M2M server in offering services to the M2M application is very limited. Accordingly, pre-configured services may not be the optimal choice for the M2M server and/or the M2M device. For example, services that are required may change due to a requirement change or context change, e.g., the M2M server has more registered devices or the M2M device moves to a new location with more communication constraints.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and system for improving negotiation services at the M2M service layer and providing capabilities for dynamically requesting services.

In one aspect of the application, a computer-implemented method is described. The method includes a step of reviewing a negotiable service layer attribute received from a negotiatee. The method also includes a step of sending a negotiation request to the negotiatee based upon the reviewed attribute. The method also includes a step of receiving an offered suggestion from the negotiatee. In one embodiment, the method includes the step of selecting the offered suggestion upon checking predetermined negotiation policies. In another embodiment, the method includes the step of the received, offered suggestion is checked against predetermined negotiations policies of the negotiatee. In another embodiment, the step of the negotiation request includes information selected from a service id, input for making suggestions, proposed suggestions and combinations thereof. According to another embodiment, the offered suggestion includes information selected from a suggestion, recommendation to negotiate with another negotiate, and combinations thereof. According to another embodiment, the step of sending the negotiation request is sent via a broker to the negotiatee. According to a further embodiment, the step of receiving the offered suggestion is received via the broker from the negotiatee.

In another aspect of the application, a computer-implemented method is described that includes a step of receiving a policy for negotiating a negotiable service layer attribute from a negotiatee. The method also includes a step of receiving a request from a negotiator to negotiate the attribute. The method also includes a step of determining whether the request complies with predetermined criteria of the negotiatee policy. Further, the method includes a step of sending an offered suggestion to the negotiator. In one embodiment, the method includes the step of receiving a negotiation confirmation from the negotiator and sending an acknowledgment to the negotiatee of the negotiation confirmation.

In yet another aspect of the application, there is described a computer-implemented method including a step of receiving a negotiation request for a negotiable service layer attribute from a negotiator. The method also includes the step of locating a negotiatee having the attribute. The method also includes a step of sending the negotiation request to the negotiatee. Moreover, the method includes a step of receiving an offered suggestion from the negotiatee for the negotiable service. According to an embodiment, the method includes a step of sending the offered suggestion to the negotiator, receiving a negotiation confirmation from the negotiator, and sending an acknowledgment to the negotiatee of the negotiation confirmation.

According to another aspect, a computer-implemented apparatus is disclosed. The apparatus includes a non-transitory memory including a negotiation service layer having instructions stored thereon for negotiating a service attribute. The apparatus also includes a processor, operably coupled to the non-transitory memory. The processor is configured to perform the instruction of reviewing the attribute received from a negotiatee. The processor is also configured to send a negotiation request to the negotiatee based upon the reviewed attribute. According to an embodiment, the processor is further configured to perform the instructions of receiving an offered suggestion from the negotiatee. In one embodiment, the computer-implemented apparatus includes a display with a user interface that is operably connected to the non-transitory memory and processor.

In even another aspect of the application, a computer-implemented apparatus is described having a non-transitory memory including a negotiation service layer having instruction stored thereon for negotiation of a service attribute. The apparatus also includes a processor that is operably coupled to the non-transitory memory and configured to perform the instructions of: (i) receiving a policy for negotiating the attribute from a negotiatee; (ii) receiving a request from a negotiator to negotiate the attribute; and (iii) determining whether the request complies with criteria of the negotiatee policy. According to an embodiment, the processor is further configured to perform the instructions of sending an offered suggestion to the negotiator. In one embodiment, the non-transitory memory stores a negotiation resource selected from common attributes, create, retrieve, delete, update, execute, label, broker, type, inputs for making a suggestion, inputs for selecting a suggestion, start, status, target, reference, offered suggestions, selected suggestions, output parameters, subscription and combinations thereof. In another embodiment, the processor uses the negotiation resource to negotiate the attribute. In another embodiment, the memory stores a policy resource selected from common attributes, label, negotiation type, negotiator, negotiatee, condition, result, select rule, subscription and combinations thereof. In a further embodiment, the processor uses the policy resource to negotiate the attribute. In even a further embodiment, the memory stores a delegation resource selected from common attributes, label, client, current negotiation broker, new negotiation broker, delegation enable, start time, duration, result, subscription and combinations thereof. In yet even a further embodiment, the processor uses the delegation resource to negotiate the attribute.

A further aspect of the application describes a computer-implemented network. The network includes a negotiator and a negotiatee. Each of the negotiator and negotiatee includes a transceiver for sending and receiving data. Each of the negotiator and negotiatee also includes a non-transitory memory having a negotiation service layer with instructions stored thereon for negotiating a service layer attribute. Each of the negotiator and negotiatee also includes a processor, operably coupled to the non-transitory memory, configured to perform a negotiation of the service layer attribute. According to an embodiment, the memory of the negotiator and negotiatee includes a resource selected from a negotiation resource, policy resource, a delegation resource and combinations thereof.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figures 1, 2:
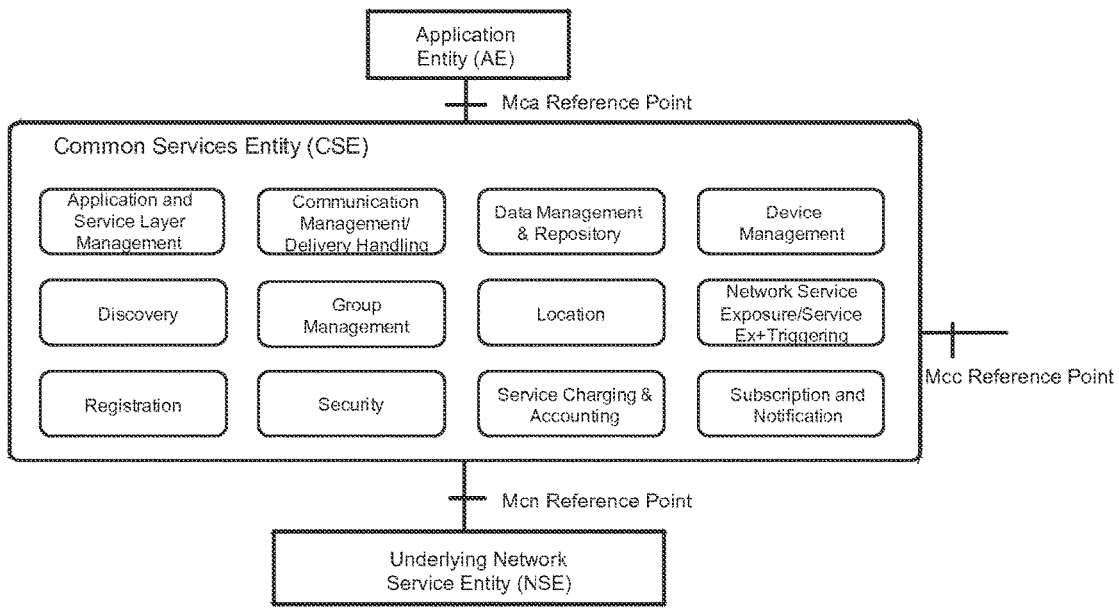
FIG. 1 illustrates a protocol stack supporting a service layer.
FIG. 2 illustrates a common service entity (CSE) and common service function (CSF).

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The present application describes techniques for employing a new function, such as a negotiation service (NGS) at a service layer, which helps service nodes and applications to dynamically request and adjust services from other service nodes or applications. In one embodiment, according to a negotiation service, a Negotiator is a M2M entity that issues a Negotiation Request and a Negotiatee is a M2M entity that receives the Negotiation Request and offers suggestions. A Negotiatee make suggestions and Negotiators select suggestions based upon pre-configured negotiation policies. These policy-based negotiation processes are well-suited for M2M systems where various services can be negotiated using such policy-based common service functions. Such functions include making suggestions and selecting suggestions suitable for negotiating different services.

In one aspect, a Negotiator can actively propose certain suggestions which help to expedite the negotiation process and reduce negotiation overhead which are especially beneficial for constrained M2M devices. In addition, a Negotiatee can recommend other Negotiatees during the negotiation process which improves the negotiation success rate and may also reduce overall negotiation signaling overhead. The Negotiatee can also combine requests from multiple Negotiators to make more intelligent suggestions to satisfy all Negotiators.

In another aspect, a Negotiation Broker is a M2M entity that can act as a proxy for the Negotiator and/or the Negotiatee. The Negotiation Broker can also forward negotiation-related messages between the Negotiator and the Negotiatee. This helps mitigate negotiation overhead at constrained devices by offloading negotiation tasks to a Negotiation Broker. According to one embodiment, a transparent mode is described where the Negotiation Broker may automatically choose corresponding Negotiatees. In the transparent mode, the Negotiation Broker may help the constrained M2M devices, i.e., Negotiators, to automatically choose Negotiatees. As such, the constrained M2M devices do not need to know the identity of the Negotiatees. In the transparent mode, the Negotiation Broker can help the constrained M2M devices, i.e., Negotiators, to automatically choose Negotiatees. As such, the constrained M2M devices do not need to know the Negotiatees.

In the proxy mode, the Negotiation Broker can act as a proxy for the constrained M2M devices to perform negotiation tasks, e.g., make suggestions and select suggestions. The constrained M2M devices only need to receive negotiation results. The proposed broker-based negotiation approach helps constrained M2M devices to perform negotiation in an easier fashion. This approach can mitigate communications overhead to/from constrained devices.

In another embodiment, a proxy for a Negotiatee is described where the Negotiation Broker makes suggestions on behalf of the Negotiatee. In the proxy mode, the Negotiation Broker can act as a proxy for the constrained M2M devices to perform negotiation tasks, i.e., make suggestions and select suggestions.

In another embodiment, a negotiation broker delegation is proposed to delegate negotiation functions from one Negotiation Broker to another. The proposed idea for recommending Negotiatees can help to improve the negotiation success rate and reduce overhead accordingly. According to an aspect, the proposed idea for combining and processing multiple negotiation requests can jointly process negotiation requests from various M2M applications and in turn helps to improve negotiation success rate and lower negotiation overhead.

Service Layer

From a protocol stack perspective, service layers are typically situated above the application protocol layer and provide value added services to client applications. Hence, service layers are often categorized as 'middleware' services. For example, FIG. 1 shows an exemplary service layer between an IP network stack and applications.

A M2M service layer is an example of one type of service layer specifically targeted toward providing value-added services for M2M type devices and applications. Recently, several industry standards bodies, e.g., oneM2M, have been developing M2M service layers to address the challenges associated with the integration of M2M types of devices and applications into deployments such as the Internet/Web, cellular, enterprise, and home network.

A M2M service layer can provide applications and devices access to a collection of M2M-oriented capabilities supported by the service layer. A few examples include but are not limited to security, charging, data management, device management, discovery, provisioning, and connectivity management. These capabilities are made available to applications via APIs which make use of message formats, resource structures and resource representations defined by the M2M service layer.

OneM2M Service Layer Architecture

OneM2M is a new standard to develop technical specifications which address the need for a common M2M Service Layer that can be readily embedded within various hardware and software, and relied upon to connect a wide variety of devices in the field with M2M application servers worldwide.

The oneM2M common service layer supports a set of Common Service Functions (CSFs), i.e., service capabilities, as shown in FIG. 2. An instantiation of a set of one or more particular types of CSFs is referred to as a Common Services Entity (CSE) which can be hosted on different types of network nodes, e.g., infrastructure node, middle node, application-specific node. OneM2M is developing the service layer in two architectural approaches called Resource Oriented Architecture (ROA) shown in FIG. 3A and Service Oriented Architecture (SOA) shown in FIG. 3B.

Figure 3A:
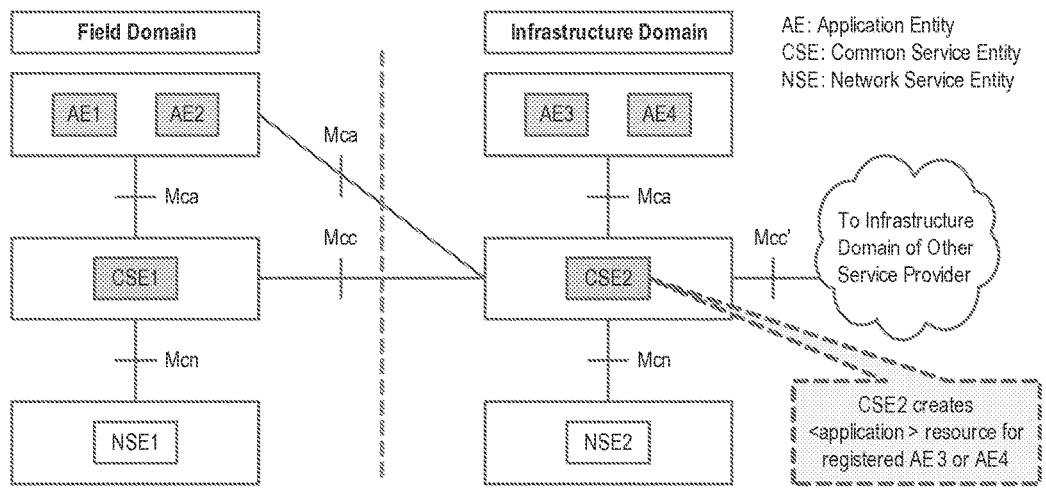
FIG. 3A illustrates a oneM2M service layer architecture.

As shown in FIG. 3A, a resource is a uniquely addressable element in the architecture having a representation that can be manipulated via RESTful methods such as Create, Retrieve, Update, and Delete. These resources are made addressable using a Uniform Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

Figure 3B:
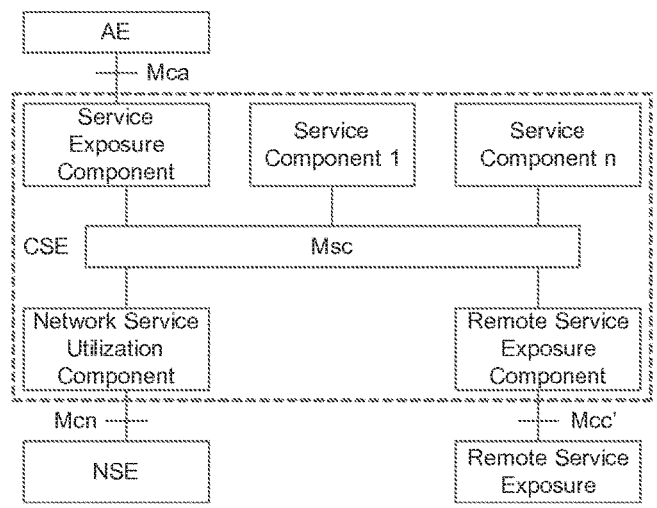
FIG. 3B illustrates a oneM2M services component architecture.

The SOA architecture is being developed to consider legacy deployment that is not RESTful-based. As shown in FIG. 3B, it reuses largely the same service layer functional architectural. The service layer contains various M2M services, and multiple services can be grouped into service components. In addition to existing reference points, it introduced the inter-service reference point Msc. Communication between M2M Service Components which pass over the Msc reference point utilizes a web services approach, e.g., Web Services Message Exchange Patterns (MEP).

OneM2M CSFs

The following twelve CSFs are currently defined in oneM2M which can be provided by a CSE such as a M2M server or endpoint M2M device to other CSEs or AEs. These are shown in FIG. 2.

Application and Service Layer Management (ASM): provides management capabilities to configure, troubleshoot and upgrade the functions of the CSE as well AEs.

Communication Management and Delivery Handling (CMDH): decides at what time to use a specific communication connection for delivering communications, e.g., CSE-to-CSE communications, and when needed and allowed, to buffer communication requests so that they can be forwarded at a later time.

Data Management and Repository (DMR): responsible for providing data storage and mediation functions. It includes the capability of collecting data for the purpose of aggregating large amounts of data, converting this data into a specified format, and storing it for analytics and semantic processing.

Device Management (DMG): provides management of device capabilities on MNs, e.g., M2M Gateways, ASNs and ADNs, e.g., M2M Devices, as well as devices that reside within an M2M Area Network.

Discovery (DIS): searches information about applications and services as contained in attributes and resources.

Group Management (GMG): responsible for handling group related requests. The request is sent to manage a group and its membership as well as for the bulk operations supported by the group.

Location (LOC): allows AEs to obtain geographical location information of Nodes, e.g., ASN, MN) for location-based services.

Network Service Exposure, Service Execution and Triggering (NSSE): manages communications with the Underlying Networks for accessing network service functions over the Mcn reference point.

Registration (REG): processes a request from an AE or another CSE to register with a Registrar CSE in order to allow the registered entities to use the services offered by the Registrar CSE.

Security (SEC): comprises functionalities such as sensitive data handling, security administration, security association establishment, access control including identification/authentication/authorization, and identity management.

Service Charging and Accounting (SCA): provides charging functions for the Service Layer. It supports different charging models which also include online real time credit control.

Subscription and Notification (SUB): provides notifications pertaining to a subscription that tracks changes on a resource, e.g., delegation of a resource.

Service Layer Negotiation

The following existing services and/or protocols can be employed in the service layer negotiation:

Negotiation Request Admission: The Negotiation Service can decide whether to accept a negotiation request from requesters, based on the relevant contexts, as well as the history of the past requests and the negotiation results. The Negotiation Service can also set up the priority of the requests based on the urgency of the negotiation.

Negotiation Party Control: The Negotiation Service can decide who to perform negotiation with. The negotiation party can be informed by the requesters or determined by the Cognition Capability based on the discovery result on the available IoT service providers, etc.

Negotiation Strategy Control: The Negotiation Service can choose the negotiation strategy on behalf of the requester. The Negotiation Service always considers the requester's best interest based on the requester's input negotiation goal.

Negotiation Adaptation: The Negotiation Service may be adapted due to the policy change or context change. The Negotiation Service policies can be dynamically adapted based on such things as context, software defined settings and input from other services. Via dynamic adaptation of policies, decisions can in turn be dynamically adapted. The Context-aware Service may dynamically update the relevant contexts to the Negotiation Service for negotiation adaptation or the Negotiation Service can proactively retrieve the relevant contexts from the Context-aware Service.

Negotiation Generalization: The Negotiation Service is able to make generalized and common negotiation strategy which is summarized from the past negotiation processes, which may be used by later negotiation requesters, and decrease the Cognition Capability's overload in deciding the negotiation strategy for each requester.

Negotiation Subscription: Subscription to the negotiation result is provided such that any adaption can be notified to subscribers. This subscription mechanism enables the autonomous adaptation. If the subscriber is using the same negotiation result of the one it subscribes to, any change to the subscribed negotiation result can trigger the subscriber to automatically adapt to it. Without the negotiation subscription, other entities are not able to re-use and follow a negotiation result. The disclosure also describes the components of the proposed intelligent Negotiation Service, and the interfaces to other IoT services, IoT entities and IoT applications.

General Architecture

Figure 4A:
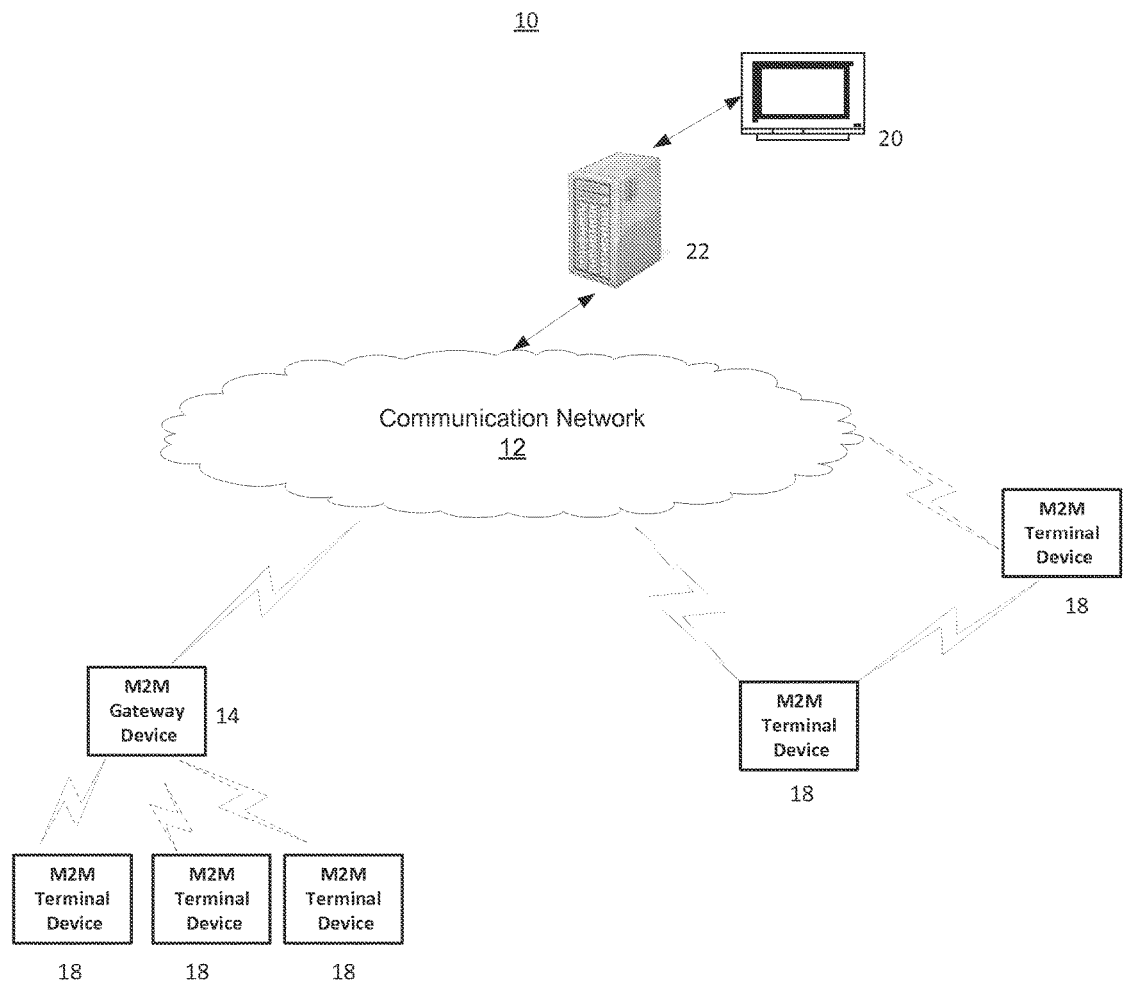
FIG. 4A illustrates an embodiment of a machine-to machine (M2M) or IoT communication system.

FIG. 4A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 4A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 4A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a SCS with a proxy, and terminal devices 18, such as UE devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. In one embodiment, the service layer 22 may be a PCE. M2M devices 18 and gateways 14 may communicate via various networks including, cellular, WLAN, WPAN, e.g., Zigbee, 6LoWPAN, Bluetooth, direct radio link, and wireline for example.

Figure 4B:
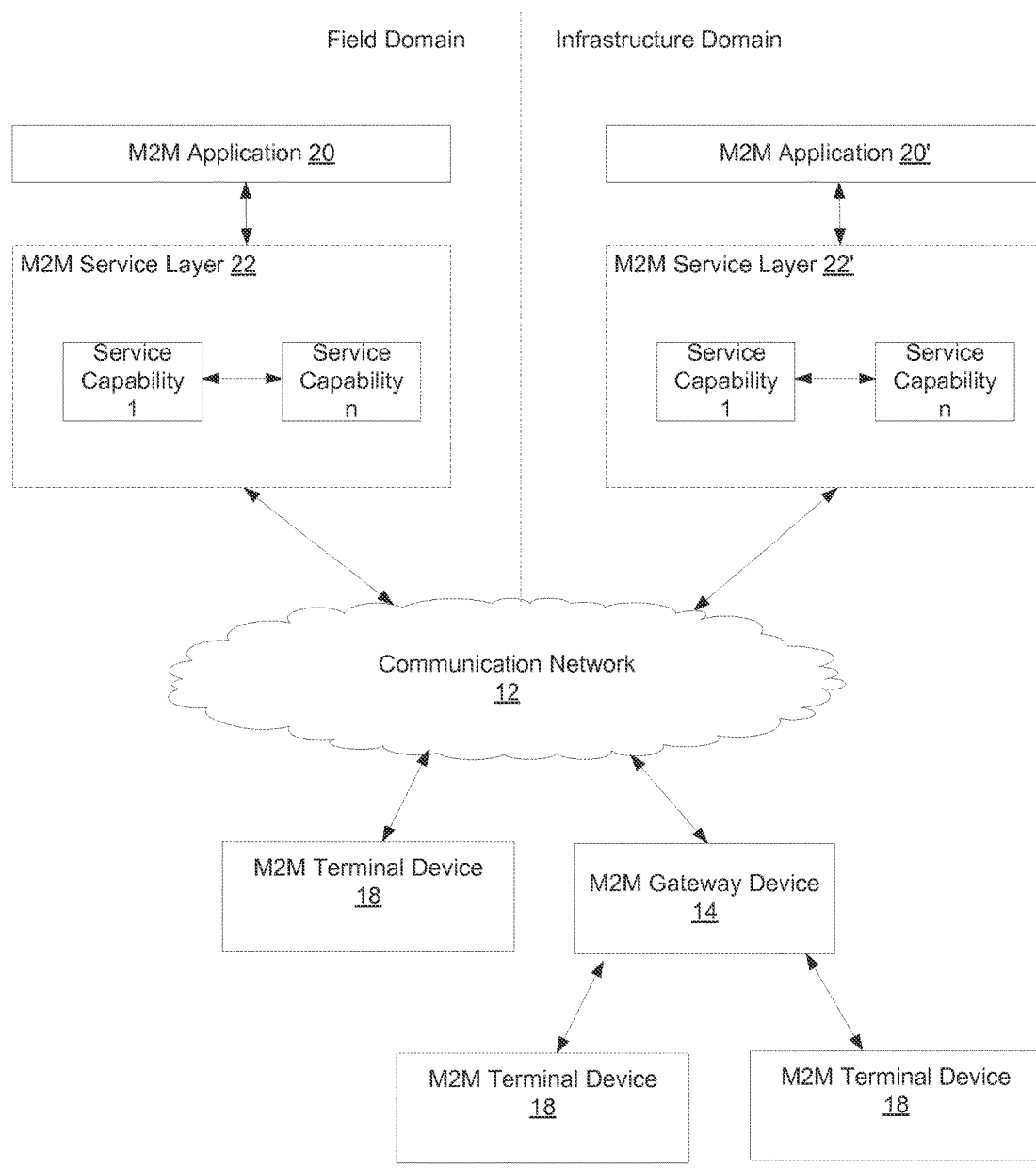
FIG. 4B illustrates an embodiment of the application of a M2M service platform.

Referring to FIG. 4B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc. In one embodiment, a negotiation service may be included in the M2M service layer 22.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 4B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, negotiation of services, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location Tracking/geo-fencing, device/service discovery, and legacy systems integration, and provides these functions as services to the M2M applications 20 and 20'. Moreover, the M2M service layer may also be configured to interface with other devices such as UEs, SCSs and MMEs as discussed in this application and illustrated in the figures.

The method of dynamically requesting services as discussed in the present application may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method of controlling and coordinating UEs PSM mode. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE), such as a SCS which may be hosted on different types of network nodes, e.g., infrastructure node, middle node, application-specific node. Further, the method of negotiating a service between a Negotiator and Negotiatee as described in the present application can be implemented as part of an M2M network that uses a Service Oriented Architecture (SOA) and/or a resource-oriented architecture (ROA) to dynamically request services according to the present application.

Figure 4C:
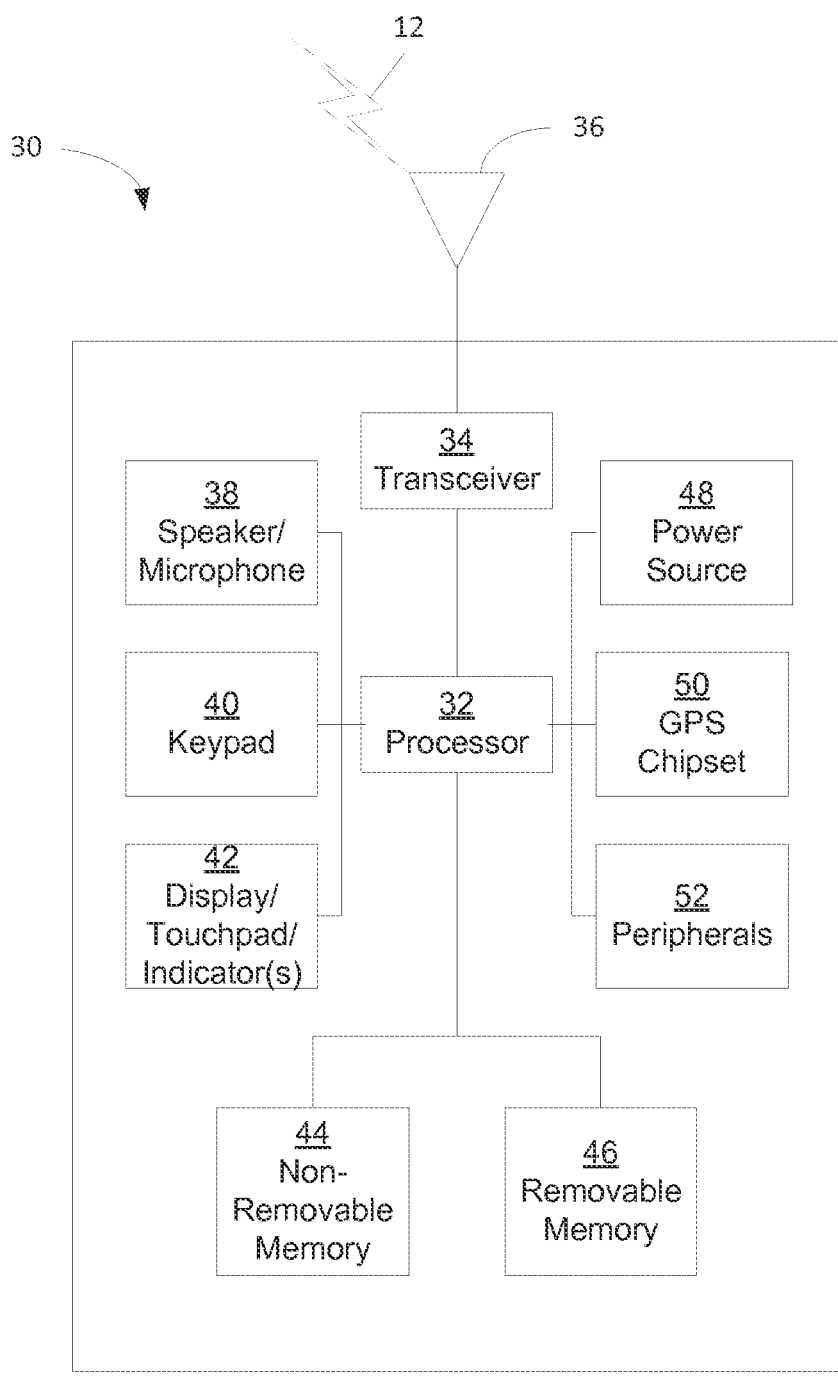
FIG. 4C illustrates an embodiment of the application of a system diagram of an example M2M device.

FIG. 4C is a system diagram of an example M2M device 30, such as a M2M terminal device 18 or an M2M gateway device 14 for example. As shown in FIG. 4C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices, including fore example LLN devices, Backbone routers and PCEs as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 4C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 4C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4D:
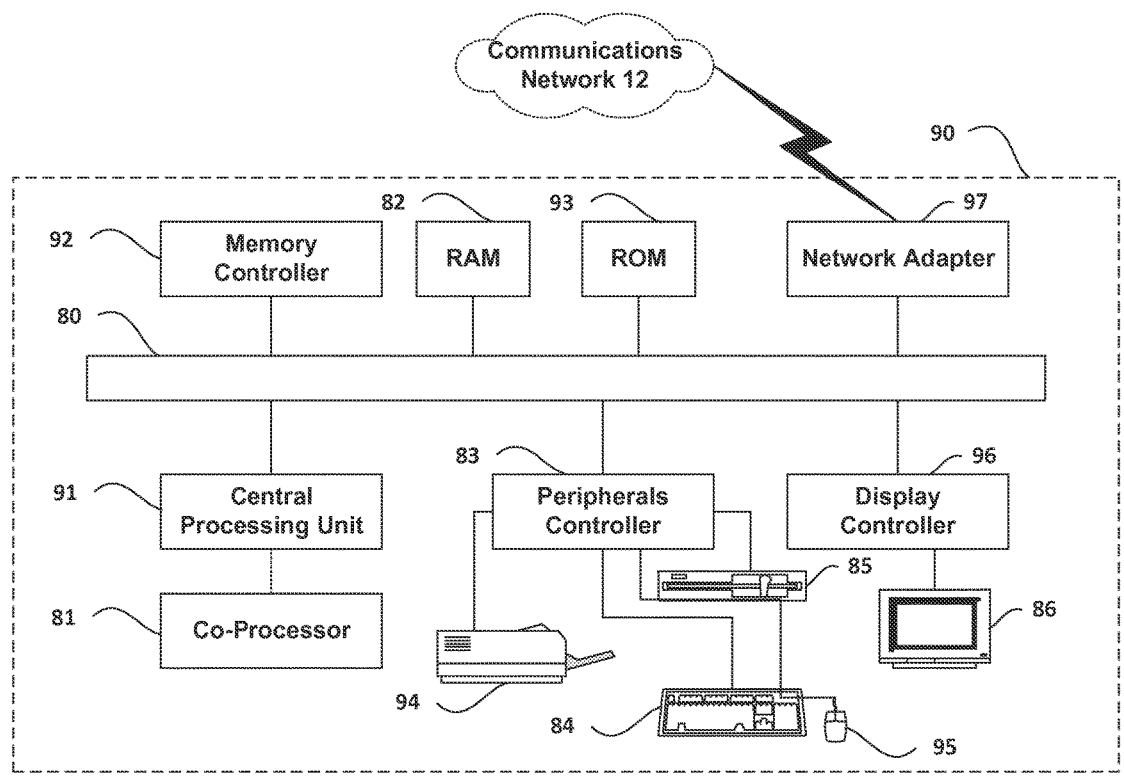
FIG. 4D illustrates an embodiment of the application of a block diagram of an exemplary computing system.

FIG. 4D is a block diagram of an exemplary computing system 90 on which, for example, the M2M service platform 22 of FIG. 4A and FIG. 4B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 4A and FIG. 4B.

Figure 5A:
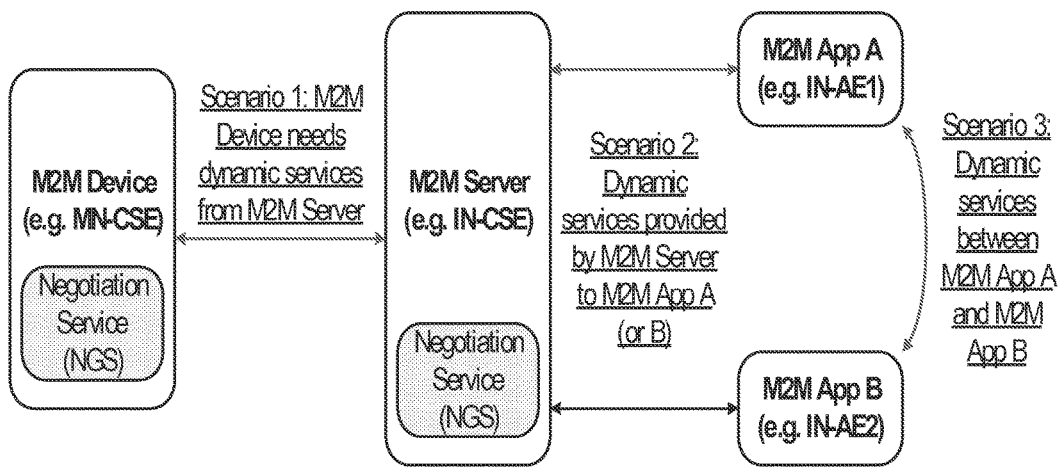
FIG. 5A illustrates an architectural view of dynamic services employing negotiation services according to an aspect of the application.

According to an aspect of the application, the NGS enables M2M entities to dynamically and efficiently request services with more flexibility. For example, FIG. 5A illustrates how the NGS can support three scenarios. The NGS resides in both the M2M Device and the M2M Server as a new function of their service layer. In an exemplary embodiment, shown as 'Scenario 1,' the M2M Device's NGS interacts with the M2M Server's NGS to fulfill service negotiation as between them. In another exemplary embodiment, shown as 'Scenario 2,' the M2M App A (or App B) talks to the M2M Server's NGS to negotiate services as requested by the M2M App A (or App B). In a further exemplary embodiment, shown as 'Scenario 3,' the M2M App A and the M2M App B negotiates services with each other via the M2M Server. That is, both applications talk to the M2M Server's NGS, which in turn help both applications to perform service negotiation.

Figure 5B:
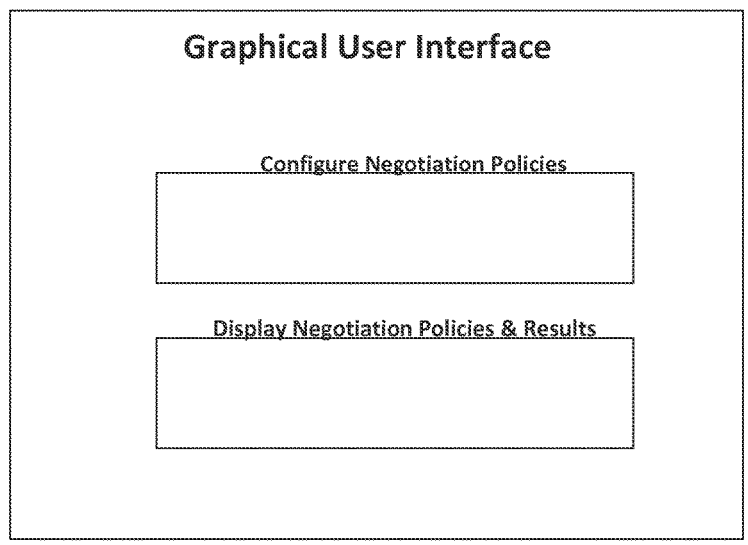
FIG. 5B illustrates a graphical user interface for configuring and displaying negotiation policies according to an aspect of the application.

In one embodiment, a graphical user interface (GUI) as shown, for example, in FIG. 5B can be used to configure/display the negotiation policies at an M2M device, gateway or server. For example, the GUI may include an area that includes a text box for displaying a configuration of negotiation policies. The GUI may also include an area that includes a text box for displaying negotiation policies and results. In an exemplary embodiment, a user can interact with the GUI via a touchscreen interface.

Procedures for Individual Negotiation Request

Figure 6:
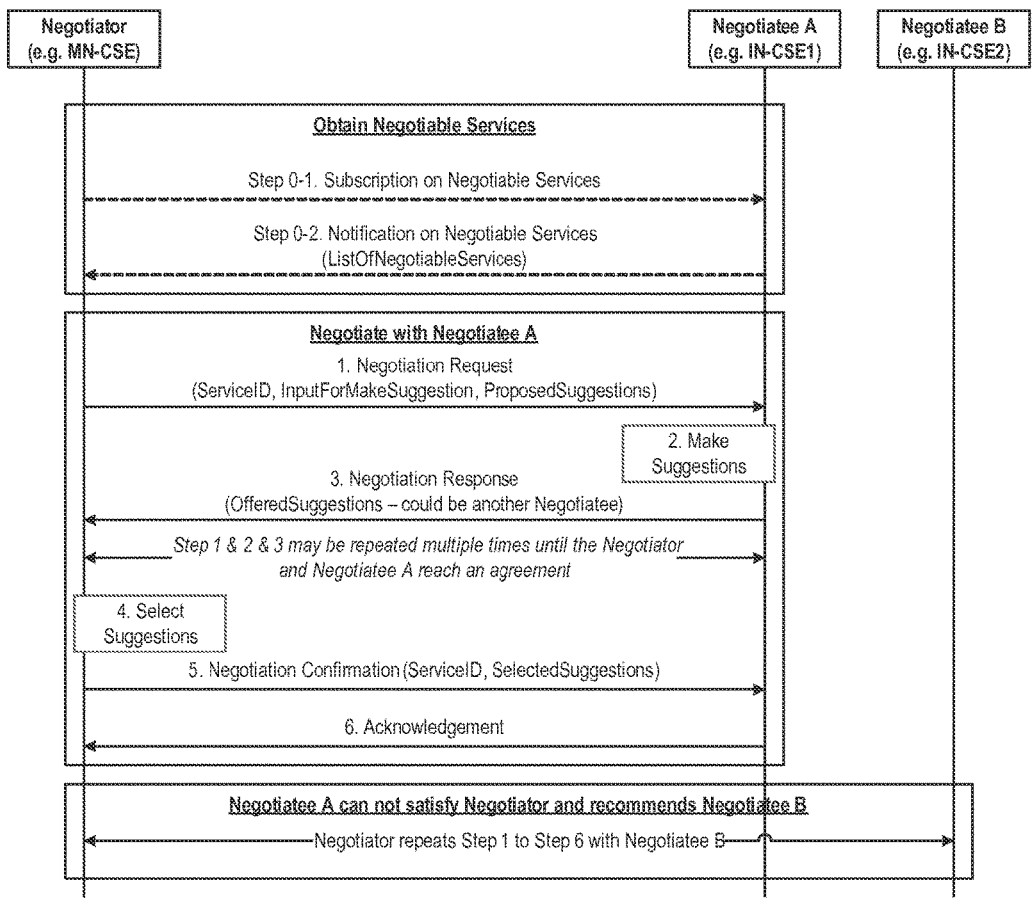
FIG. 6 illustrates a service negotiation protocol for an individual negotiation request according to an aspect of the application.

According to an embodiment, FIG. 6 illustrates the service negotiation process for individual negotiation requests. Each of the steps in FIG. 6 is denoted by a Roman numeral. Negotiatee A indicates or notifies Negotiator of negotiable services. Here, negotiable services are defined as any service if its features, or configuration, can be dynamically negotiated and provided to different M2M entities. For example, a data management service provided by a M2M server is negotiable if the storage size and charging rate for different M2M devices can be dynamically negotiated and allocated. However, the registration service provided by a M2M server may not be negotiable if each M2M device always needs to use the same registration service to associate with the M2M server.

The Negotiator conducts the proposed negotiation process with Negotiatee A. Negotiator may negotiate a set of services in one embodiment. In another embodiment, the Negotiator may negotiate features of a specific service. There will be two results from this negotiation process: 1) Negotiator and Negotiatee A reach an agreement; or 2) Negotiatee A cannot meet Negotiator's requirement and recommends another Negotiatee, e.g., Negotiatee B. As part of the negotiation process, the Negotiator may be optionally authenticated by the Negotiatee A and optionally, Negotiatee A may be authenticated by the Negotiator. As part of the authentication process, the Negotiator and Negotiatee A may be authenticated using pre-configured credentials. Additional credentials may be provided, e.g., keys for message authentication/integrity protection, which may be used for authentication purposes during future messages exchanges between the Negotiator and Negotiatee A. Ensuring the possession of keys by either the Negotiator and/or Negotiatee may be one form of implicit authentication. Optionally, authorization credentials may be provisioned to the Negotiator which can be used to access negotiated services.

According to the alternative embodiment discussed above, if the Negotiator does not have an agreement with Negotiatee A, it may perform negotiation with another Negotiatee B as recommended by Negotiatee A. Similar to the authentication process or optional mutual authentication process between Negotiator and Negotiatee A, an authentication and authorization process may be carried out between the Negotiator and the Negotiatee B.

Figure 7:
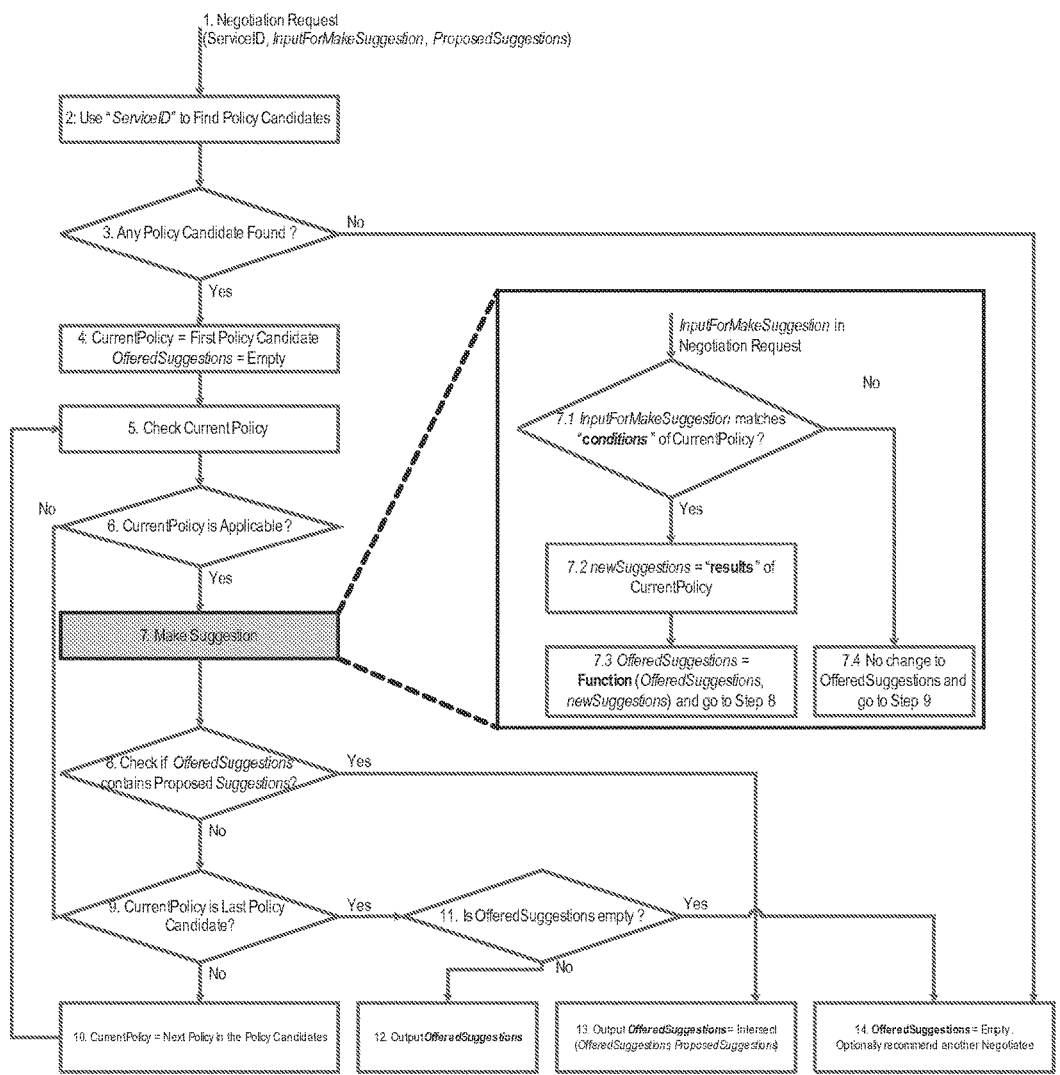
FIG. 7 illustrates a decision query for making suggestions at a negotiatee according to an aspect of the application.

Each of the steps in FIG. 7 is represented by a Roman numeral. For example, in Step 0-1, Negotiator issues "Subscription on Negotiable Services" to Negotiatee A. As a result, Negotiator will receive an automatic notification in Step 0-2 from Negotiatee A if a service becomes negotiable. This means its partial or entire features/functionalities can dynamically be requested, changed, and/or configured. Negotiator may comprise various subscription criteria in this step such as a list of target services. The subscription criteria may also include features that may not be negotiable at the moment. Alternatively, the Negotiator can send a specific message to the Negotiatee to discover or retrieve, e.g., using the RESTful RETRIEVE operation, the list of negotiable services at Negotiatee A. Accordingly, Negotiatee A will respond back to the Negotiator with the list of negotiable services it provides.

At some later instance, if any of its services becomes negotiable and the change meets the subscription criteria in Step 0-1, Negotiatee A sends "Notification on Negotiable Services" message to the Negotiator. The purpose of this message is to inform the Negotiator of a list of negotiable services at Negotiatee A. This message may contain the following information:

ListOfNegotiableService: it contains the name, identifier, and/or description of each negotiable service, e.g., ServiceID. For each negotiable service, Negotiatee A may indicate which features of the service are negotiable and how long the service and its features will be available. Negotiatee A may also specify expected inputs from the Negotiator for each negotiable service.

Next, in Step 1, the Negotiator sends "Negotiation Request" message to Negotiatee A to initiate a negotiation. This message may contain the following information:

ServiceID: the name, identifier and/or description of services to be negotiated with the Negotiatee A. For each service to be negotiated, the Negotiator may explicitly request to negotiate on one or more than one features of this service. Negotiator would be able to know this information from Step 0-2. For example, the Service ID may indicate that the negotiator wants to acquire more, or faster, storage.

InputForMakeSuggestion: The Negotiator provides necessary inputs which will be leveraged by Negotiatee A to make suggestion in Step 2. Basically, in this Step, Negotiatee A uses this parameter to compare against a "Condition" parameter in each negotiation policy to check the applicability of each negotiation policy. The Negotiator would be able to know which input information should be provided from Step 0-2. For example, if the Service ID indicates that the negotiator wants to acquire more and/or faster storage, then the InputForMakeSuggestion ID may indicate how much storage is required or what access speeds are required of the storage.

ProposedSuggestions: The Negotiator may propose certain suggestions to Negotiatee A, which can help to simplify the operations at Negotiatee A and expedite the negotiation process. Basically, the ProposedSuggestions parameter has the same meaning of "Result" parameter in each negotiation policy maintained at Negotiatee A. The ProposedSuggestions represents an example of a service that that the Negotiator will find acceptable.

Then in Step 2, Negotiatee A takes information from Step 1 as input to make suggestions based on its local policies. The output of this Step is OfferedSuggestions to be sent to the Negotiator in Step 3. FIG. 7 provides a procedure for how the Negotiatee may go about making these suggestions. Note, Negotiatee A may simply accept ProposedSuggestions from the Negotiator without checking its policies or if there are no any applicable policies.

Next, in Step 3, Negotiatee A sends a "Negotiation Response" message to the Negotiator. This message contains OfferedSuggestions. This parameter may include multiple suggestions to the Negotiator, or simply indicate another Negotiatee B if the number of currently performed negotiation rounds surpasses a pre-configured threshold at the Negotiatee A. Note that the Nogotiatee A and B may reside in the same service domain. The Negotiatee A may also indicate ListOfNegotiableServices at Negotiatee B if it knows, e.g., Negotiatee A and Negotiatee B may perform Step 0-1 and Step 0-2 at an early time and know each other's negotiable services. If OfferedSuggestions only contains another Negotiatee B, the Negotiator will halt the current negotiation and start a new negotiation process directly with the Negotiatee B. In this case, Step 4, Step 5, and Step 6 will be skipped.

After receiving a "Negotiation Response" message, the Negotiator may repeat Step 1 to start another negotiation around if it is not satisfied with the OfferedSuggestions. Otherwise, Negotiator conducts Step 4 if it is satisfied with certain suggestions contained in OfferedSuggestions. In the repeated Step 1, the Negotiator may submit new parameter values for ServiceID, InputForMakeSuggestion, and ProposedSuggestions.

In Step 4, the Negotiator selects appropriate suggestions from OfferedSuggestions based on negotiation policies it maintains. Note that the Negotiator may simply choose the received OfferedSuggestions without checking its policies or if are no any applicable policies. In Step 5, the Negotiator sends a "Negotiation Confirmation" message to the Negotiatee A. This message contains SelectedSuggestions from Step 4 and ServiceID. The ServiceID could be the same as or a subset of that in Step 1. In Step 6, the Negotiatee A may send an "Acknowledgement" message to the Negotiator. As a result, the Negotiator and the Negotiatee A reach an agreement on the services being negotiated. The Negotiator may set a threshold for the maximum number of negotiation rounds to be repeated, i.e., the repeated Steps 1, 2, and 3. Alternatively, Negotiatee A may reject the Negotiator's request if the number of repeated requests, i.e., Step 1, is bigger than a pre-configured threshold. When the number of performed negotiation rounds exceeds this threshold and if there is still not any agreement between the Negotiator and the Negotiatee A (or B), the Negotiator may stop the negotiation process or change its negotiation policy. According to another embodiment, it is envisaged that no policies are employed if a user is making the determination.

FIG. 7 illustrates how a Negotiatee may make suggestions, e.g., Step 2 in FIG. 6. The Negotiatee uses a policy-based approach to make suggestions. That is, the Negotiatee maintains certain negotiation policies for all negotiable services. Each negotiation policy may have the following information or parameters:

ServiceID: indicates the name, identifier, and/or description of services which this negotiation policy is applicable to.

Condition: indicates circumstances under which this negotiation policy can be applied.

Results: indicates suggestions to be made if "Condition" is satisfied.

Negotiator: indicate the list of negotiators for which this negotiation policy is applicable. Policy examples are given in Table 1. As an example, a M2M server that serves as a Negotiatee may maintain these policies to provide more flexible device management services. These policies can be created by the M2M server itself or by a special administrator application.

TABLE 1

| Policy Number | ServiceID | Condition | Results | Negotiator |
|---|---|---|---|---|
| 1 | Device Management | Number of devices is between 10 and 100 | Monthly rate = $5.00 per device; Features = {Battery Monitoring} | Gateways for Smart Home Applications |
| 2 | Device Management | Number of devices is between 10 and 100 | Monthly rate = $7.00 per device; Features = {Battery Monitoring + Firmware Management} | Gateways for Smart Home Applications |
| 3 | Device Management | Number of member devices is between 100 and 500. | Monthly rate = $2.00 per device; Features = {Battery Monitoring} | Smart Transportation Application |
| 4 | Device Management | Number of member devices is between 100 and 500. | Monthly rate = $3.00 per device; Features = {Battery Monitoring + Firmware Management} | Smart Transportation Application |

The following steps are needed for a Negotiatee to make suggestions. The Negotiatee takes parameter values in the received "Negotiation Request" as input to compare with its local negotiation policies to obtain all potential suggestions. If a policy is applicable, e.g., "InputForMakeSuggestion" matches "Condition" in the policy, the "Result" of the policy will be potential suggestions. It is envisaged that although policy candidates are checked in FIG. 7, the Negotiatee may optionally check a certain number of policy candidates. Each of the steps in FIG. 7 is denoted by a Roman numeral.

In Step 1, the Negotiatee takes the received "Negotiation Request" message as inputs. Note that this message contains three parameters: ServiceID, InputForMakeSuggestion, and ProposedSuggestions. In Step 2, the Negotiatee uses "ServiceID" to locate policy candidates from its local negotiation policy database for the current "Negotiation Request". A local policy becomes a policy candidate if its "ServiceID" covers "ServiceID" contained in "Negotiation Request". The Negotiatee may use "Negotiator" information to filter the policies and to make the policy candidate list more accurate. The output of this step is a policy candidate set which contains certain policies potentially applicable to the received "Negotiation Request". Policies may dictate if the Negotiatee authenticates the Negotiator based on pre-provisioned credentials. The Negotiator may optionally authenticate the Negotiatee in a similar manner.

According to Step 3, the Negotiatee checks if there is any policy candidate found in Step 2. If Yes, can move to Step 4; otherwise, go to Step 13. In Step 4, Negotiatee sets CurrentPolicy as the first policy in policy candidate set as discovered in Step 2. Then, set OfferedSuggestions to be empty. In Step 5, Negotiatee checks CurrentPolicy makes a decision about its applicability to the current "Negotiation Request." In Step 6, a check is made whether the CurrentPolicy is applicable. If so, the Negotiatee goes to Step 7 to make suggestions. Otherwise, Negotiatee moves to Step 9 to check next policy, if any are available. For example, a candidate policy may become expired or is not allowed for the Negotiator.

According to Step 7, Negotiatee makes suggestion based on CurrentPolicy. In Step 7.1, the NGS compares InputForMakeSuggestion with "Condition" of CurrentPolicy. If both match with each other, CurrentPolicy will be applied; otherwise, CurrentPolicy has no impact on making suggestion. The "Condition" may contain certain information related to Negotiatee's local context information. In this case, Negotiatee may also check its current context information against "Condition."

In Step 7.2, "Results" of CurrentPolicy will be picked as newSuggestions. In Step 7.3, OfferedSuggestions will be updated according to the function f(OfferedSuggestions, newSuggestion), which could be simply adding newSuggestions onto OfferedSuggestions. In Step 7.4, there is no change to OfferedSuggestions.

Next, in Step 8, Negotiatee checks if OfferedSuggestions contains "ProposedSuggestions" from Negotiator. If Yes, ProposedSuggestions will be set as OfferedSuggestions" (Step 13). The intersection of OfferedSuggestions and ProposedSuggestions will be chosen as the final OfferedSuggestions for Negotiator.

The process of making suggestions ends. If No, Step 9 checks other policy candidates. The Negotiatee may simply ignore the Negotiator's ProposedSuggestions.

In Step 9, Negotiatee checks if CurrentPolicy is the last policy in the policy candidate set. If No, then a next policy in policy candidate set will be chosen as CurrentPolicy (Step 10). Then, the process leads back to Step 5.

If Yes, a check is made whether OfferedSuggestions is empty. If No, the output is the offered suggestions (Step 12). If Yes, the Negotiatee finds none of policies applicable to the received "Negotiation Request" and may recommend another Negotiatee to Negotiator (Step 14).

Select Suggestions at Negotiator

Figure 8:
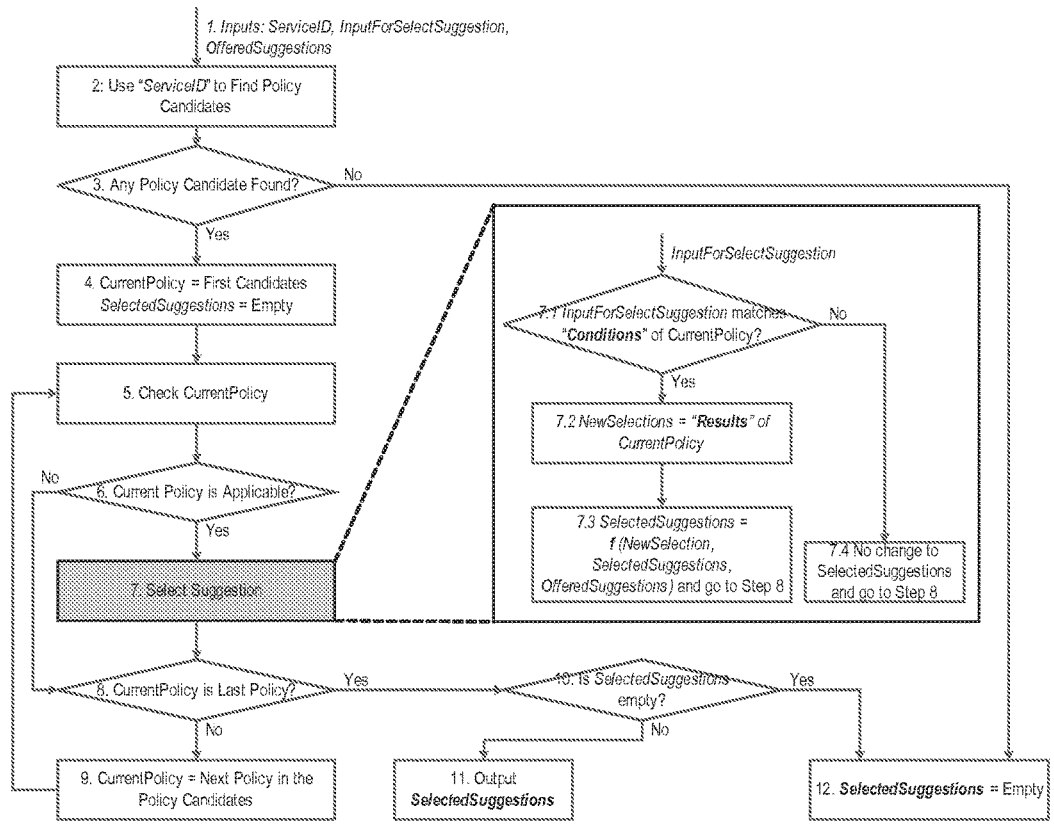
FIG. 8 illustrates a decision query for selecting suggestions at a negotiator according to an aspect of the application.

FIG. 8 illustrates the details of selecting suggestions conducted by a Negotiatee. This is related to Step 4 of FIG. 6. It is proposed in this disclosure that Negotiator uses policy-based approaches to select suggestions. Basically, Negotiator maintains certain negotiation policies. Each negotiation policy may have the following information or parameters:

ServiceID: indicates the name, identifier, and/or description of services which this negotiation policy is applicable for.

Condition: indicates circumstances under which this negotiation policy can be applied. For example, the Condition may include or indicate what protocol the service being negotiated uses.

Results: indicates suggestions to be selected if "Condition" is satisfied.

Negotiatee: indicate the list of Negotiatees for which this negotiation policy is applicable for.

A few policy examples are given in Table 2. As an example, a M2M device as a Negotiator may maintain these policies to request more flexible device management services. These policies can be created by an application on the M2M device or by a special administrator application. The Negotiator can also use these policies to obtain ProposedSuggestions by following similar procedures discussed above.

TABLE 2

| Policy Number | ServiceID | Condition | Results | Negotiatee |
|---|---|---|---|---|
| 1 | Device Management | Number of devices is between 10 and 100 | Monthly rate = less than $4.00 per device; Features = {Battery Monitoring} | M2M Server from Operator A |
| 2 | Device Management | Number of devices is between 10 and 100 | Monthly rate = less than $8.00 per device; Features = {Battery Monitoring + Firmware Management} | M2M Server from Operator A |
| 3 | Device Management | Number of member devices is between 100 and 500. | Monthly rate = less than $3.00 per device; Features = {Battery Monitoring} | M2M Server from Operator A and B |
| 4 | Device Management | Number of member devices is between 100 and 500. | Monthly rate = less than $4.00 per device; Features = {Battery Monitoring + Firmware Management} | M2M Server from Operator A and B |

The following steps are needed for a Negotiator to select suggestions in FIG. 8. The Negotiator takes parameter values in the received "Negotiation Response" as input to compare with its local negotiation policies to select appropriate suggestions. If a policy is applicable, i.e., "InputForSelectSuggestion" matches "Condition" in the policy, the "Result" of the policy will be potential SelectedSuggestions. While all policy candidates are checked in FIG. 8, the Negotiator may optionally only check a certain number of policy candidates.

In Step 1, the Negotiator takes the following parameters as inputs:

ServiceID which was received in "Negotiation Response" message from the Negotiatee.

OfferedSuggestions which was received in "Negotiation Response" message from Negotiatee.

InputForSelectSuggestion which is a local parameter determined and maintained by the Negotiator. Note that this parameter is policy-dependent. For policies in Table 2, InputForSelectSuggestion will be "the number of devices to be managed". The Negotiator uses this parameter to compare against "Condition" of each policy candidate to determine and select appropriate suggestions.

Next in Step 2, Negotiator uses "ServiceID" to locate policy candidates from its local negotiation policy database. A local policy becomes a policy candidate if its "ServiceID" covers "ServiceID" in Step 1. Negotiator may furthermore use "Negotiatee" information to filter out more irrelevant policies. The output of this step is a policy candidate set which contains certain policies potentially applicable to the received "Negotiation Response".

In Step 3, the Negotiator checks if there is any policy candidate found in Step 2. If Yes, the procedure moves to Step 4 where the Negotiator sets CurrentPolicy as the first policy in the policy candidate set as discovered in Step 2. Then, sets SelectedSuggestions to an empty set. Otherwise, go to Step 11.

In Step 5, Negotiator checks CurrentPolicy about its applicability to the current "Negotiation Response." In Step 6, if CurrentPolicy is applicable, Negotiator goes to Step 7 to select suggestions based on CurrentPolicy.

In Step 7.1, the NGS compares InputForSelectSuggestion with "Condition" of CurrentPolicy. If both match with each other, CurrentPolicy will be applied. Otherwise, CurrentPolicy has no impact on selecting suggestion. The "Condition" may contain certain information related to Negotiator's local context information. In this case, Negotiator may also check its current context information against "Condition". In Step 7.2, "Results" of CurrentPolicy will be chosen as NewSelections. In Step 7.3, SelectedSuggestions will be updated according to the function f(NewSelections, SelectedSuggestions, OfferedSuggestions), which could be simply adding the intersection of NewSelections and OfferedSuggestions to the current SelectedSuggestions. In Step 7.4, there is no change to SelectedSuggestions.

If the answer is No from Step 6, Negotiator moves to Step 8 to check next policy, if any. For example, a candidate policy may become expired or is not allowed for the Negotiatee which sent the "Negotiation Response". In Step 8, Negotiator checks if CurrentPolicy is the last policy in the policy candidate set. If No, the procedure moves to Step 9 where the Next policy in the policy candidate set will be chosen as CurrentPolicy. Then, it goes go back to Step 5 to check CurentPolicy.

If the answer from step 8 is yes, go to Step 10 where Negotiator checks whether SelectedSuggestions is empty. If Yes, the procedure moves to Step 12 and Negotiator finds none of policies is applicable to the received "Negotiation Response". SelectedSuggestions will be empty. The Negotiator may start a new negotiation round. Otherwise, if the answer from Step 10 is No, go to Step 11. Here, the Negotiator comes to this step after checking all policy candidates and outputs SelectedSuggestions. SelectedSuggestions chosen by the Negotiator may not be subset of OfferedSuggestion, i.e., there is no any intersection between SelectedSuggestions and OfferedSuggestion. In this case, the Negotiator will resume resending a new "Negotiation Request," i.e., Step 1 in FIG. 6, and the SelectedSuggestions could be contained in the new "Negotiation Request" as ProposedSuggestions.

Procedures for Multiple Negotiation Requests

Figure 9:
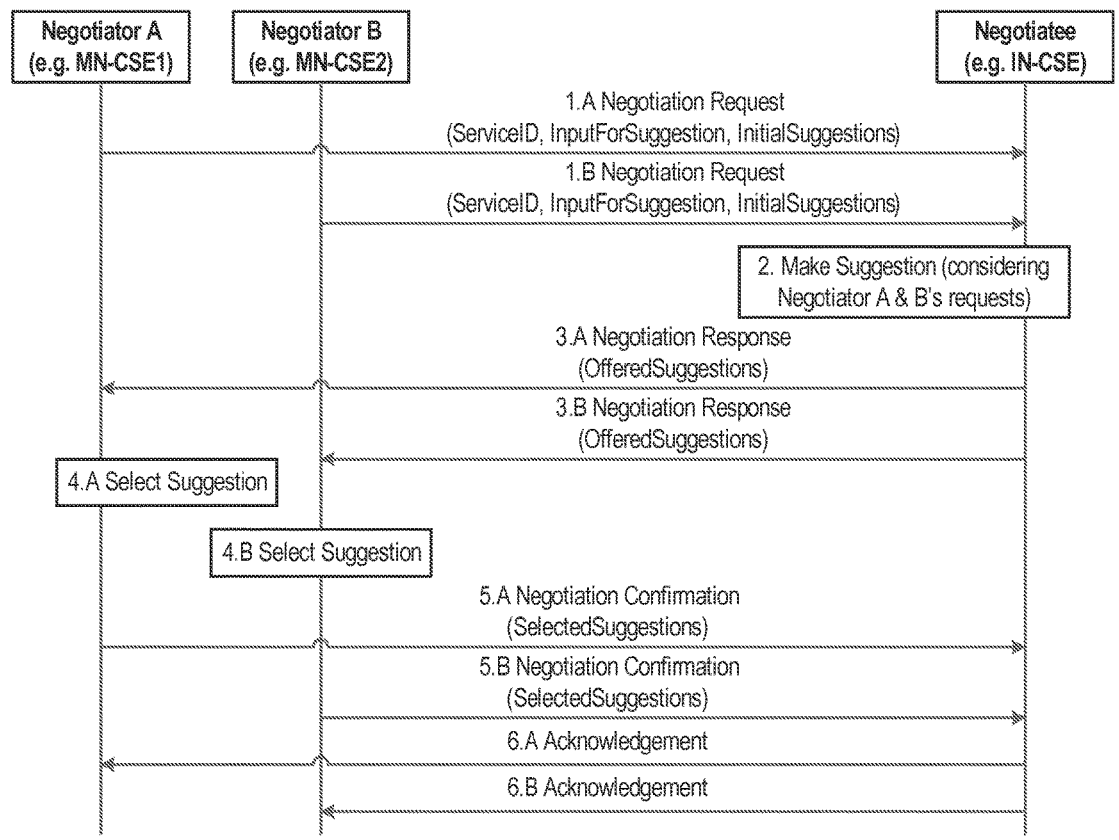
FIG. 9 illustrates a flowchart for service negotiation for multiple negotiation requests according to an aspect of the application.

As illustrated in FIG. 6, the Negotiatee (either A or B) treats each Negotiation Request or Negotiator independently. In fact, by jointly considering multiple requests from different negotiators, the Negotiatee may make better suggestions to Negotiators, especially for the scenarios where multiple Negotiators may be logically associated with each other, e.g., from the same location, request the same type of services, have the same type of devices, have the similar negotiation history and behavior in the past, etc. In one example, negotiation requests with the same ServiceID could be considered jointly. The Negotiatee may buffer the received negotiation request in order to perform such combination. The Negotiatee may have configured special policies which are only applicable when multiple requests are jointly considered. For this purpose, an alternative procedure for basic service negotiation is developed in FIG. 9, where Negotiatee makes suggestions by jointly considering negotiation requests from two Negotiators A and B. Each of the steps in FIG. 9 is represented by a Roman numeral.

In Step 1A, Negotiator A sends "Negotiation Request" to Negotiatee. In Step 1B, Negotiator B sends "Negotiation Request" to Negotiatee. In Step 2, Negotiatee makes suggestions considering both requests from Negotiator A and B. Negotiatee may first conduct the procedure in FIG. 7 independently for Negotiator A and Negotiator B to get two values of OfferedSuggestions. Then, the final OfferedSuggestions will be the intersection of these two values. If there is no intersection, the Negotiatee may just simply suggest two OfferedSuggestions values (one for the Negotiator A and another for the Negotiator B).

If there is no intersection, the Negotiatee may take one of these two OfferedSuggestions and send it to both Negotiators. If there is no intersection, the Negotiatee may notify both Negotiators to change their next-time negotiation request so that an intersection of two OfferedSuggestions could be potentially reached next time.

Alternatively, Negotiatee may first locate policies which are applicable for both Negotiator A and Negotiator B. Then, it makes suggestions based on these policies according to the same procedure in FIG. 7. The OfferedSuggestions for Negotiator A and Negotiator B may likely be different dependent on the policies that the Negotiatee uses to determine the OfferedSuggestions.

In Step 3A, Negotiatee sends "Negotiation Response" to Negotiator A. In Step 3B, Negotiatee sends "Negotiation Response" to Negotiator B.

In Step 4A, Negotiator A selects suggestions from OfferedSuggestions in Step 3A. In Step 4B, Negotiator B selects suggestions from OfferedSuggestions in Step 3B. In Step 5A. Negotiator A sends a "Negotiation Confirmation" to Negotiatee. In Step 5B, Negotiator B sends a "Negotiation Confirmation" to Negotiatee. In Step 6A, Negotiatee sends an "Acknowledgement" to Negotiator A. In Step 6B, Negotiatee sends an "Acknowledgement" to Negotiator B.

Broker-Based Service Negotiation

The process to make suggestion or select suggestions may be too heavy for constrained M2M devices. In order to solve this issue, broker-based service negotiation where a Negotiation Broker helps to make suggestion on behalf of the Negotiatee and/or to select suggestions on behalf of the Negotiator is described. The Negotiation Broker can also be delegated from one broker to the other broker. According to FIGS. 10 and 11, Steps 0-1 and Step 0-2 as shown in FIG. 6, can be used between the Negotiator and the Negotiation Broker so that the Negotiator can get automatic notification about the list of negotiable services that the Negotiation Broker can handle.

Figure 10:
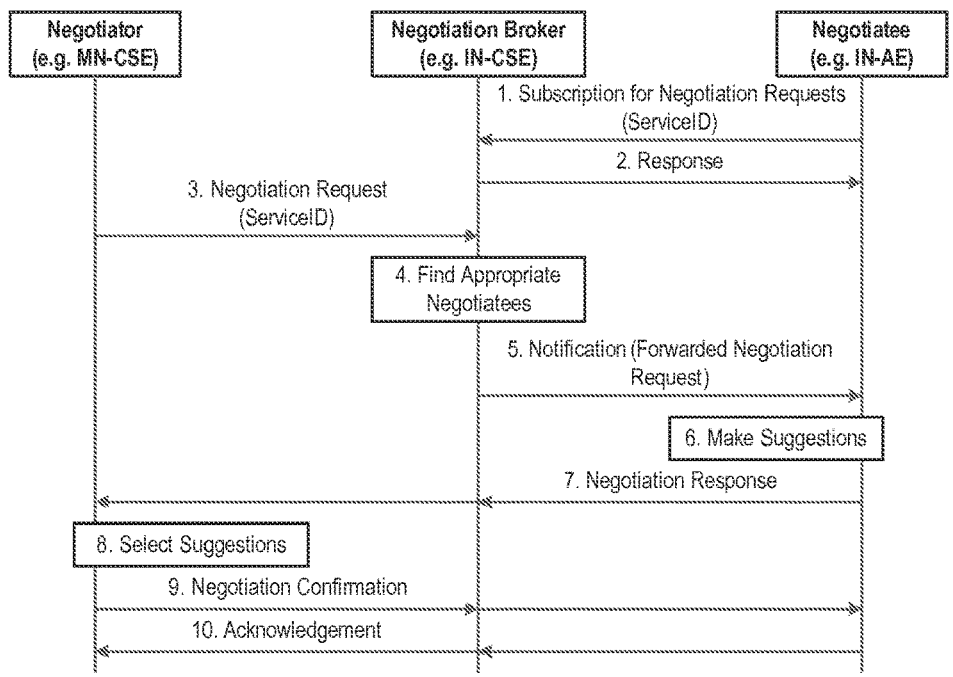
FIG. 10 illustrates a flowchart for broker-based service negotiation in a transparent mode according to an aspect of the application.

In the transparent mode, the Negotiation Broker does not make suggestions or select suggestions, but helps the Negotiator to find an appropriate Negotiatee, e.g., forward the request to a Negotiatee whose list fits the request or to a Negotiatee with light load, and simply forward negotiation-related messages between the Negotiator and the Negotiatee. The following steps are introduced as shown in FIG. 10.

In Step 1, the Negotiatee sends "Subscription for Negotiation Requests" to the Negotiation Broker. The message basically tells the Negotiator Broker that the Negotiatee is able to perform negotiation on services denoted by ServiceID. In Step 2: The Negotiation Broker sends a "Response" to the Negotiatee. For each service, the Negotiation Broker will maintain a list of Negotiatees which are interested in the service and can provide negotiations for it. Then in Step 3, the Negotiator sends a "Negotiation Request" to the Negotiation Broker. The step is the same as Step 1 in FIG. 6. In Step 4, the Negotiation Broker uses "ServiceID" contained in "Negotiation Request" to find appropriate Negotiatees for the received "Negotiation Request".

According to step 5, the Negotiation Broker sends "Notification" as a response to the subscription in Step 1 to the corresponding Negotiatee. This notification is actually to forward a "Negotiation Request." In Step 6, the Negotiatee makes suggestions. Further in Step 7, the Negotiatee sends a "Negotiation Response" to the Negotiator via the Negotiation Broker. In one embodiment, the Negotiation broker checks the offered suggestions against pre-configured policies set by the Negotiator.

The Negotiator selects suggestions in Step 8. In Step 9, the Negotiator sends a "Negotiation Confirmation" to the Negotiatee via the Negotiation Broker. In Step 10, the Negotiatee sends an "Acknowledgement" to the Negotiator via the Negotiation Broker.

Step 1 and Step 2 may happen one or more times because there may be multiple Negotiatees. Each set of Steps 1 and 2 is for an individual Negotiatee. Step 5, Step 6, and Step 7 may happen one or more times because there may be multiple Negotiatees. Each set of Step 5, Step 6, and Step 7 is for an individual Negotiatee.

Figure 11:
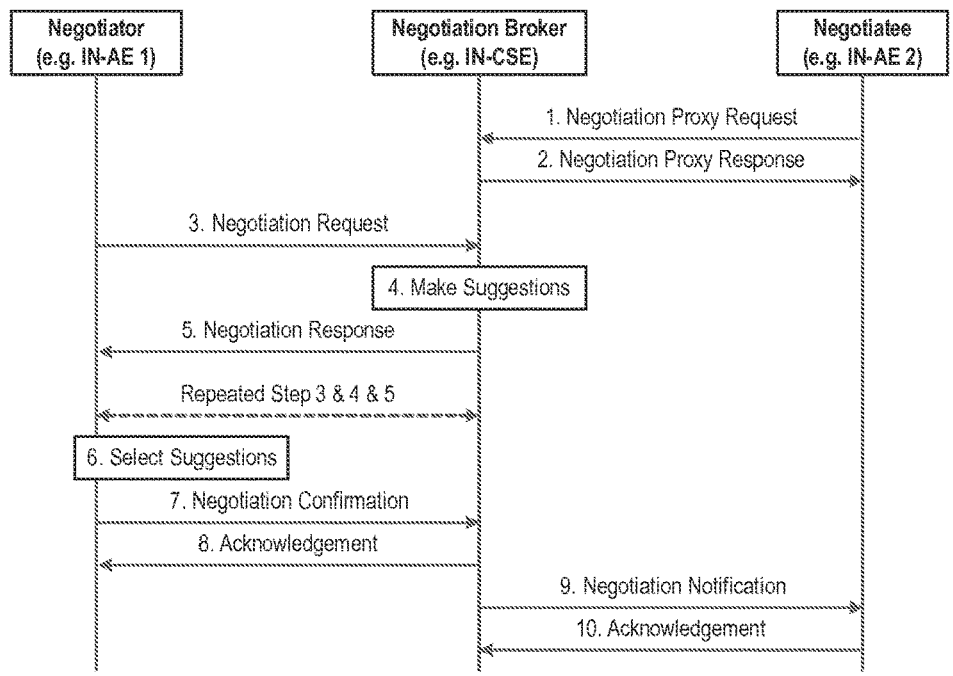
FIG. 11 illustrates a flowchart for broker-based service negotiation as a proxy for negotiating according to another aspect of the application.

According to another embodiment, FIG. 11 illustrates the scenario where the Negotiation Broker acts as a proxy for the Negotiatee. In Step 1, the Negotiatee sends "Negotiation Proxy Request" to the Negotiation Broker. The Negotiatee may pass its negotiation policies to the Negotiation Broker at this step. Negotiatee may use separate procedures to create its negotiation policies at its Negotiation Broker.

In Step 2, the Negotiation Broker sends "Negotiation Proxy Response" to the Negotiatee. Note that this step may be skipped and Step 9 will be the final response to the Negotiatee. Steps 1 and 2 may not be needed if the Negotiatee has already been registered to, or associated with, the Negotiation Broker and by default, the Negotiation Broker will perform proxy functions for the Negotiatee. Steps 1 and 2 may be preceded by discovery and association phases between the Negotiatee and the Negotiation Broker. As part of the association phase, the Negotiation Broker and Negotiatee may be provisioned with, or derive authentication credentials which, may be used for authentication at later stages.

Next in Step 3, the Negotiator sends a "Negotiation Request" to the Negotiation Broker. This step is the same as Step 1 in FIG. 6. Prior to sending the "Negotiation Request" message the Negotiator may be authenticated by the Negotiation Broker or alternatively, the Negotiator and Negotiatee may mutually authenticate one-another based on established credentials. Alternatively, authentication/mutual authentication may be carried out during the "Negotiation Request" phase wherein possession of the right credentials are verified as part of the "Negotiation Request" message using cryptographic procedures.

In Step 4, the Negotiation Broker makes suggestion on behalf of the Negotiatee according to negotiation polices sent in Step 1. This step is the same as Step 2 in FIG. 6. In Step 5, the Negotiation Broker sends a "Negotiation Response" to the Negotiator. This step is the same as Step 3 in FIG. 6. If the Negotiator is not satisfied with Offered-Suggestions contained in Step 5, Step 3, Step 4, and Step 5 may be repeated.

According to Step 6, the Negotiator selects appropriate suggestions. This step is the same as Step 4 in FIG. 6. In Step 7, the Negotiator sends a "Negotiation Confirmation" to the Negotiation Broker. This step is the same as Step 5 in FIG. 6. In Step 8, the Negotiation Broker sends an "Acknowledgement" to the Negotiator. This step is the same as Step 6 in FIG. 6. Next, in Step 9, the Negotiation Broker sends "Negotiation Notification" to the Negotiatee. This message may contain the following information: (i) the name or identifier of the Negotiator; (ii) the name, identifier, and/or description of the services being negotiated; and (iii) the selected suggestion by the Negotiator. Further in Step 10, the Negotiatee sends an "Acknowledgement" to the Negotiation Broker.

It is noted that Step 1 and Step 2 may happen multiple times because there may be multiple Negotiatees. Each set of Step 1 and Step 2 is for an individual Negotiatee. Also Step 9 and Step 10 may occur multiple times because there may be multiple Negotiatees. Each set of Step 9 and Step 10 is for an individual Negotiatee.

Figure 12:
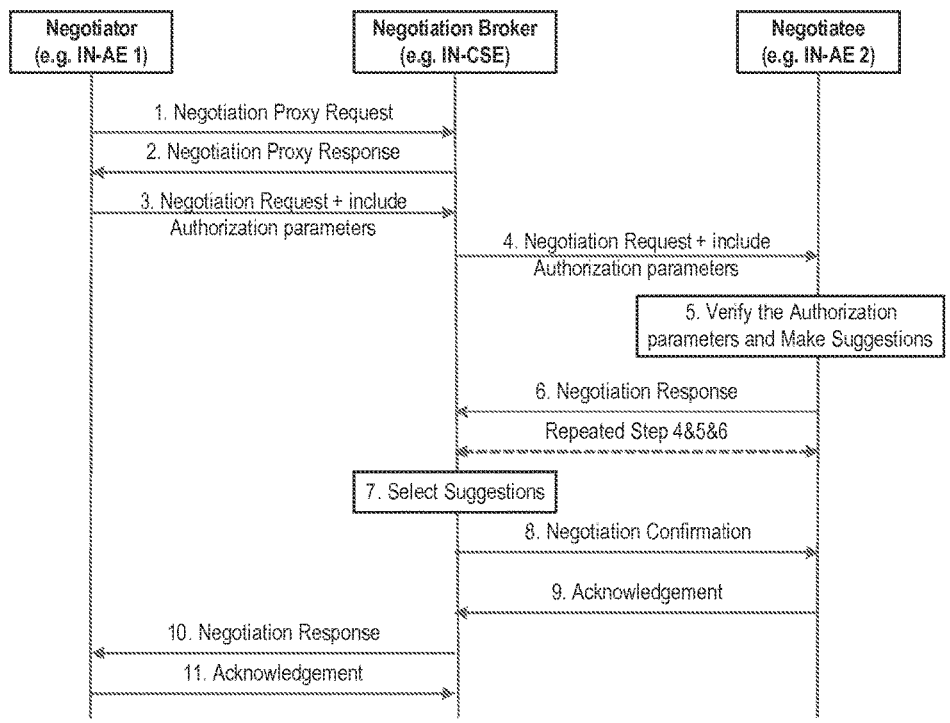
FIG. 12 illustrates a flowchart for broker-based service negotiation with authentication and authorization protocols according to another aspect of the application.

According to another embodiment, FIG. 12 illustrates the scenario where the Negotiation Broker acts as a proxy for the Negotiator, wherein Authentication and Authorization functions are added to entities involved. In Step 1, the Negotiator sends "Negotiation Proxy Request" to the Negotiation Broker. The Negotiator may pass its negotiation policies to the Negotiation Broker at this step. Negotiator may use separate procedures to create its negotiation policies at its Negotiation Broker. The Negotiator may request the certain security mechanisms and functions in order to enable Authentication, Authorization and Secure communications. Alternatively, the request for the setting up of security functions may be performed by the Negotiation Broker at Step 2. The Negotiation Request may be sent over a secure communications channel.

In Step 2, the Negotiation Broker sends "Negotiation Proxy Response" to the Negotiator. Note that this step may be skipped and Step 10 will be the final response to the Negotiator. Step 1 and 2 may not be needed if the Negotiator has already been registered to or associated with the Negotiation Broker and by default the Negotiation Broker will perform proxy functions for the Negotiator.

In Step 3, the Negotiator sends "Negotiation Request" to the Negotiation Broker. This step is similar to Step 1 in FIG. 6. In addition, the Negotiator and the Negotiation Broker may mutually authenticate one another. Optionally, as part of the Negotiation Request message, the Negotiator may send session-based Authorization Parameters that were provisioned to the Negotiator by a Negotiatee or a third-party entity.

In Step 4: The Negotiation Broker forwards the Negotiation Request to the Negotiatee along with the Authorization parameters. From the Negotiatee's perspective, it feels this message is from the Negotiation Broker. In Step 5, based on the Negotiatee verifying the Authorization parameters, the negotiatee then makes suggestions. This step is similar to Step 2 in FIG. 6. Step 6 is similar to Step 3 in FIG. 6. If the Negotiator Broker is not satisfied with OfferedSuggestions contained in Step 6, Step 4, Step 5, and Step 6 may be repeated.

According to Step 7, the Negotiator Broker selects appropriate suggestions. This step is the similar to Step 4 in FIG. 6. In Step 8, the Negotiation Broker sends "Negotiation Confirmation" to the Negotiatee. This step is the similar to Step 5 in FIG. 6. Thereafter in Step 9, the Negotiatee sends an "Acknowledgement" to the Negotiation Broker. This step is the same as Step 6 in FIG. 6. Next in Step 10, the Negotiation Broker sends "Negotiation Response" to the Negotiator. This message is similar to Step 3 in FIG. 6. Further in Step 11, the Negotiator sends an "Acknowledgement" to the Negotiation Broker. The security mechanisms (Authentication, Authorization and Secure communications) and functions described above may be used and applicable for other embodiments where third-party trust may be required.

Figure 13:
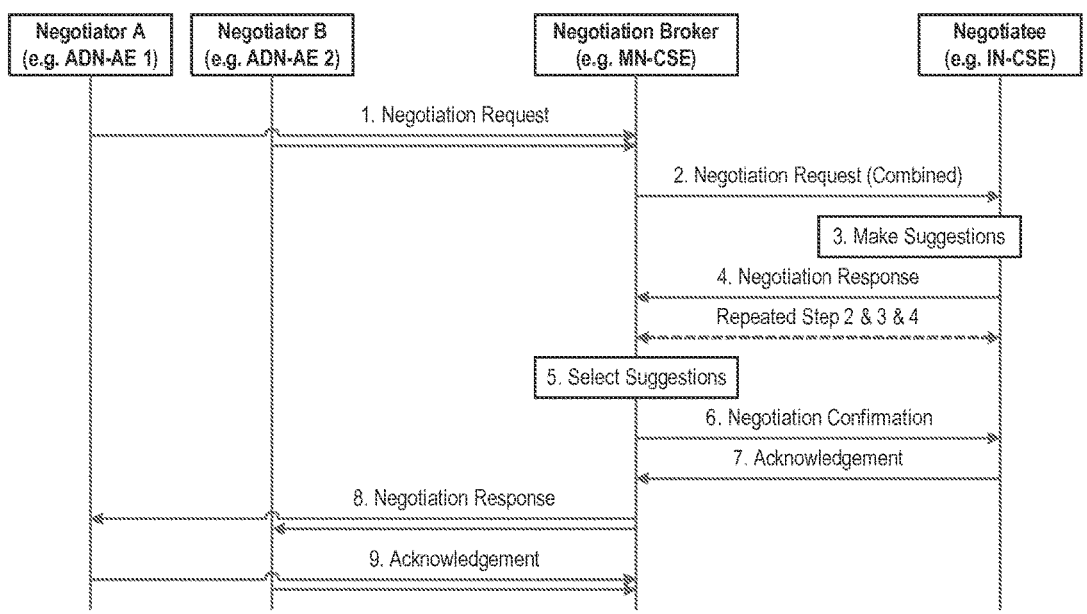
FIG. 13 illustrates a flowchart for broker-based service negotiation employing a combination of negotiation requests according to another aspect of the application.

According to further embodiment as illustrated in FIG. 13, the Negotiation Broker may combine multiple Negotiation Requests and sends a combined Negotiation Request to the Negotiatee to improve negotiation efficiency. Although FIG. 13 shows two Negotiators, the Negotiation Broker can combine Negotiation Requests from more than two Negotiators. Please note that FIG. 13 does not show the "Negotiation Proxy Request & Response" between Negotiators and the Negotiation Broker, which is actually the same as FIG. 12. The following steps are described for FIG. 13.

In Step 1, the Negotiator A and B respectively send a Negotiation Request to the Negotiation Broker. In Step 2, the Negotiation Broker combines these two Negotiation Requests by putting both in a combined new Negotiation Request, which is sent to the Negotiatee. In Step 3, the Negotiatee makes suggestions. This step is similar to Step 2 in FIG. 6. In Step 4, the Negotiatee sends "Negotiation Response" to the Negotiation Broker. This step is similar to Step 3 in FIG. 6. Next in Step 5, the Negotiation Broker selects suggestions on behalf of both Negotiators. This step is the same as Step 4 in FIG. 6. Subsequently in Step 6, the Negotiation Broker sends "Negotiation Confirmation" to the Negotiatee. This step is similar to Step 5 in FIG. 6.

In Step 7, the Negotiatee sends an "Acknowledgement" to the Negotiation Broker. This step is the same as Step 6 in FIG. 6. According to Step 8, the Negotiation Broker sends two "Negotiation Response", respectively, to Negotiator A and B. This step is the same as Step 10 in FIG. 6. Then in Step 9, the Negotiator A and B, respectively, sends an "Acknowledgement" to the Negotiation Broker. This step is similar to Step 11 in FIG. 6. While FIG. 13 does not show multiple Negotiatees, Steps 2 through Step 7 can be applied to interactions between the Negotiation Broker and another Negotiatee.

Figure 14:
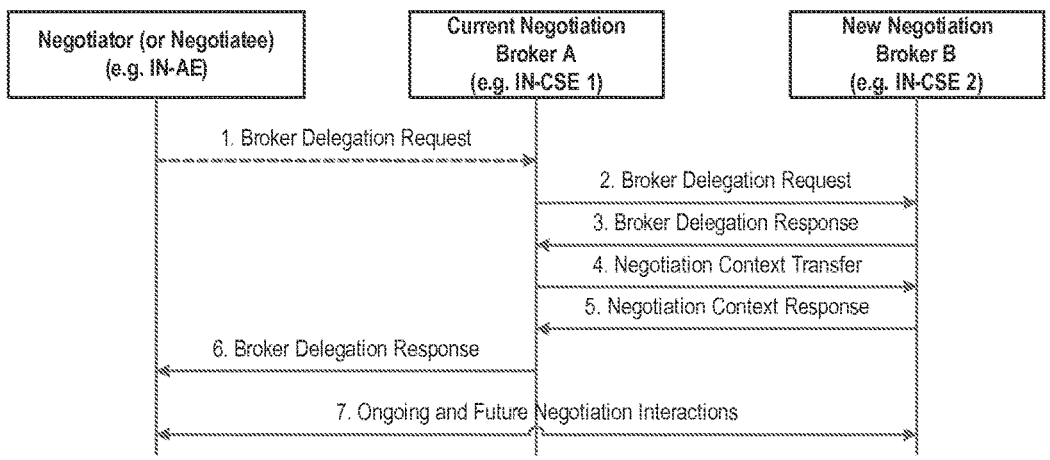
FIG. 14 illustrates a flowchart for broker-based service delegation according to another aspect of the application.

According to another embodiment, a Negotiation Broker may become overloaded and in turn it can delegate its functions to another Negotiation Broker. Such broker delegation could be initiated by a Negotiator/Negotiatee (if the Negotiator/Negotiatee is able to know the current Negotiation Broker needs to be delegated and/or able to determine the new Negotiation Broker) or actively by the current Negotiation Broker. FIG. 14 illustrates the procedures for broker delegation from current Negotiation Broker A to new Negotiation Broker B.

According to Step 1, the Negotiator (or Negotiatee) sends "Broker Delegation Request" to the current Negotiation Broker A. This message may include but is not limited to the address, name, and/or identifier of new Negotiation Broker B. Alternatively, the current Negotiation Broker A may choose a new Negotiation Broker for the Negotiator/Negotiatee. This step is optional if the broker delegation is actively triggered by the current Negotiation Broker A.

In Step 2, the current Negotiation Broker A sends a "Broker Delegation Request" to the new Negotiation Broker B. This message may include but is not limited to the following information: address, name, and identifier of the Negotiator/Negotiatee. Authentication information which can be used to verify whether the current Negotiation Broker A is the legal broker for the Negotiator/Negotiatee. The start time for the new Negotiation Broker B to take in effect for the Negotiator/Negotiatee. The time duration for the new Negotiation Broker B to act as a broker for the Negotiator/Negotiatee.

In Step 3, the new Negotiation Broker B sends "Broker Delegation Response" to the current Negotiation Broker A. If the new Negotiation Broker B refuses the delegation request, the following steps 4 and 5 will be skipped and the broker delegation is unsuccessful. According to Step 4, the current Negotiation Broker A sends "Negotiation Context Transfer" to the new Negotiation Broker B. This message is used to transfer necessary context information such as negotiation policies for the Negotiator/Negotiatee to the new Negotiation Broker B. According to Step 5, the new Negotiation Broker B sends "Negotiation Context Response" to the current Negotiation Broker A.

Next in Step 6, the current Negotiation Broker A sends "Broker Delegation Response" to the Negotiator/Negotiatee. This message may contain the following information: address, name, and/or identifier of the new Negotiation Broker B. The start time and duration that the new Negotiation Broker B will act as a proxy for the Negotiator/Negotiatee. Further in Step 7, the Negotiator/Negotiatee uses similar procedures as described to conduct service negotiation with the new Negotiation Broker B.

According to yet another embodiment, various triggers for a Negotiator to initiate service negotiation process are described. For example, when an M2M device begins to generate increased data volumes it may not be able to store all the data local, it may initiate the negotiation process with its M2M server to get more storage. If the M2M device finds that it must increase the rate at which it uploads data, it may negotiate again with the M2M server to request more frequent operations on the stored data.

A M2M application for device management may start to negotiate with its M2M server to request to manage more M2M devices when new M2M devices are added into the system. A M2M application finds that the end-to-end delay between itself and another M2M application has increased. In an exemplary embodiment, the communications are relayed by a M2M server. The M2M application may wish to initiate service negotiation with the M2M server to reduce the time for buffering its request messages at the M2M server.

Negotiable Services

Figure 15:
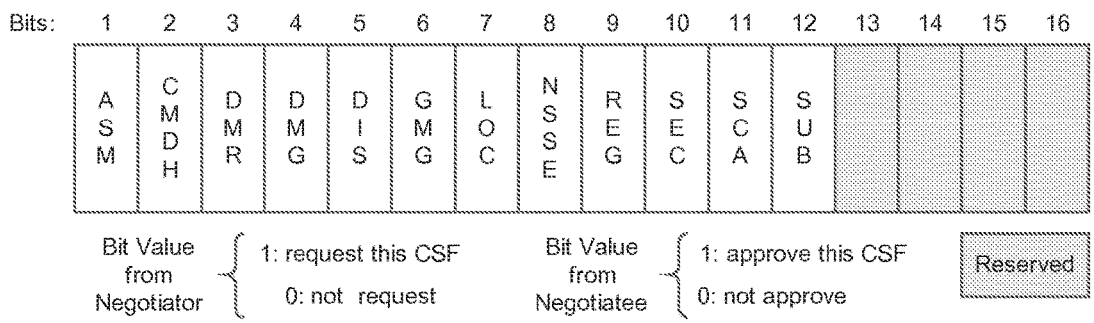
FIG. 15 illustrates an exemplary embodiment of a CSF Bitmap.

Examples to explain which M2M services can be negotiated and in which way, in the context of oneM2M architecture are disclosed. There are basically two levels of service negotiation:

In Level-1, a M2M device negotiates with an M2M server about the desired CSFs which it needs to use. In other words, the M2M device may request to use a subset of CSFs provided by the M2M server. For Level-1 service negotiation, a 16-bit CSF bitmap as shown in FIG. 15 could be leveraged by the M2M device to indicate its preference, and by the M2M server to indicate the approved CSFs. Each bit represents a CSF and the last four bits are reserved for future use. Please note that REG CSF is the default CSF which the M2M device has to choose in order to use other CSFs.

Figure 16:
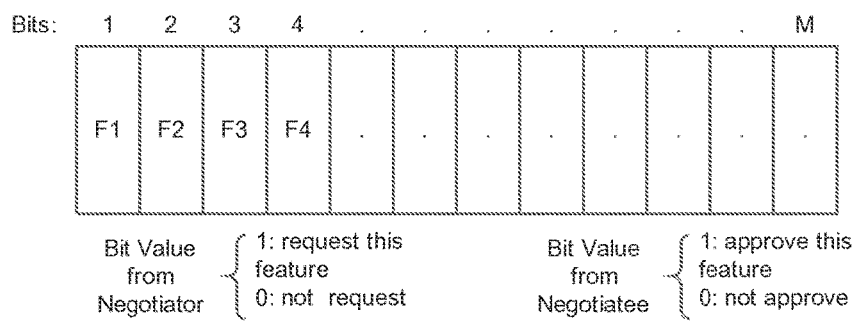
FIG. 16 illustrates an exemplary embodiment of a CSF Feature Bitmap.

In Level-2, a M2M device may also negotiate with the M2M server about features or functionalities of each individual CSF. For Level-2 service negotiation, each CSF has different features and functionalities which can be negotiated. For example, the M2M device can negotiate with the M2M server about desired DMG functionalities because it may not need to use all DM functionalities provided by the M2M server. More examples and details are given in Table 3. Similar to the example of CSF bitmap, FIG. 16 illustrates an example of CSF feature bitmap where each feature, e.g., F1, F2, of a CSF is represented by one bit assuming that the CSF has M features and need M bits.

In scenario 1, when the M2M device generates more data, it may initiate the negotiation process with the M2M server to get more storage. Later on, if the M2M device determines that the data changes too fast and needs more frequent data updating, it may again negotiate with the M2M server to request more frequent operations on the stored data.

New CSF: Negotiation Service (NGS)

Figure 17:
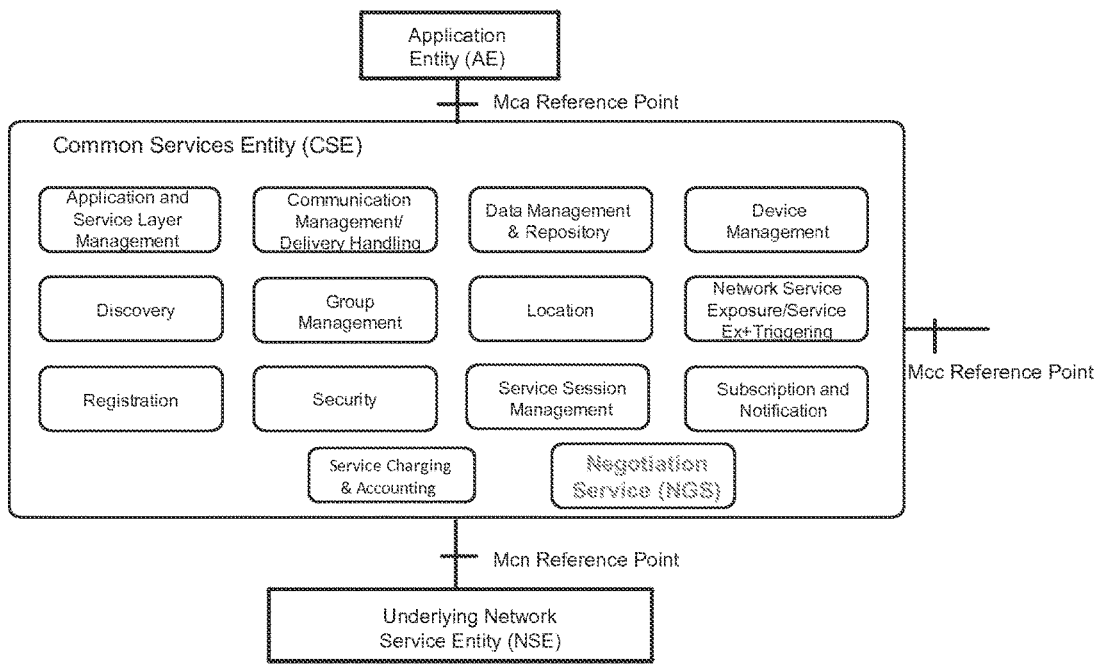
FIG. 17 illustrates a oneM2M architecture including a negotiation service (NGS) according an aspect of the application.

FIG. 17 shows an exemplary embodiment for implementing the proposed Negotiation Service as a new CSF based on the current oneM2M functional architecture. Alternatively, some NGS functions can be added as a part of DMG CSF to perform device management related negotiations which may occur or be required during device bootstrap, device firmware uploading, etc.

Figure 18:
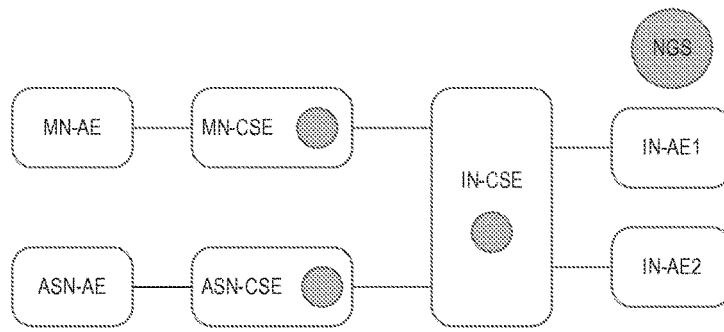
FIG. 18 illustrates a NGS CSF in oneM2M resource oriented architecture (ROA) according to an aspect of the application.

In one embodiment, this NGS function may be hosted within a M2M service layer instance hosted by an M2M node, such as an M2M server, M2M gateway, or M2M device. For example, the NGS may comprise an individual service capability within the M2M service layer instance or as a sub-function within an existing service capability As shown in the embodiment of FIG. 18, the proposed NGS CSF can reside in a MN-CSE, an ASN-CSE, or an IN-CSE. The NGS CSF will have the functionalities of Negotiator, Negotiation Broker, and/or Negotiatee as described above. The service negotiation can be performed in following ways.

TABLE 1

Negotiable Functionalities/Features

| CSFs | Unique Negotiable Features | Common Negotiable Features |
|---|---|---|
| ASM | Required functionalities (i.e. configuration management, software management) | When will this CSF be used? |
| CMDH | How long will requests be buffered<br>The maximum number of requests to be buffered at a certain amount of time<br>The maximum storage size allocated for buffering request | How long will this CSF be used?<br>What is the charging rate for this CSF? |
| DMR | The maximum storage size to be requested<br>The frequency to access the stored data<br>The maximum number of requests to access the storage data within a certain amount of time | |
| DMG | The number of devices to be managed<br>Management protocols to be used<br>Required functionalities (i.e. device configuration function, device diagnostics and monitoring function, device firmware management function, device topology management function) | |
| DIS | The frequency to issue discovery request<br>The resource scope which the DIS can search<br>The number of returned resources<br>The maximum discovery requests within a certain amount of time | |
| GMG | The maximum number of members allowed in a group<br>The maximum number of allowed groups<br>The frequency to issue group management request<br>The need for bulk operations and result aggregation<br>The need for hierarchical group relationship (i.e. group resource as a member of another group resource) | |
| LOC | The type of desired location information<br>The accuracy of desired location information<br>The frequency to access and report location information<br>The need for privacy protection | |
| NSSE | The maximum number of connections over Mcn<br>The maximum length of a connection over Mcn<br>The need for feeding information to CMDH | |
| REG | N/A | |
| SEC | Access control scheme (i.e. identification, authentication, and authorization)<br>The need for identity management<br>The need for data security | |
| SCA | Charging mode (i.e. subscription-based charging, event-based charging)<br>The need for online charging or offline charging<br>The need for independent service layer charging and/or correlated charging with the underlying networks<br>The maximum number of charging records to be generated with a certain amount of time | |
| SUB | The maximum number of resources to make subscriptions<br>The frequency to send notifications<br>The need for subscription to a group resource | |

If MN-CSE directly negotiates services with IN-CSE, the MN-CSE's NGS will be the Negotiator to select suggestions and IN-CSE's NGS will be the Negotiatee to make suggestions. If MN-CSE negotiates services with ASN-CSE indirectly via IN-CSE, MN-CSE's NGS will be the Negotiator to select suggestions. Moreover, IN-CSE's NGS will be the Negotiation Broker in transparent mode. Further, ASN-CSE's NGS will be the Negotiatee to make suggestions.

If IN-AE1 indirectly negotiates services with MN-CSE via IN-CSE, IN-AE1 will be the Negotiator, IN-CSE's NGS will be the Negotiation Broker of IN-AE1 to select suggestions, and ASN-CSE's NGS will be the Negotiatee to make suggestions.

If IN-AE2 negotiates services with IN-AE1 indirectly via IN-CSE, IN-AE2 will be the Negotiator, IN-CSE's NGS will be the Negotiation Broker for both IN-AE1 and IN-AE1 to make suggestions and select suggestions, and IN-AE1 will be the Negotiatee.

Figure 19:
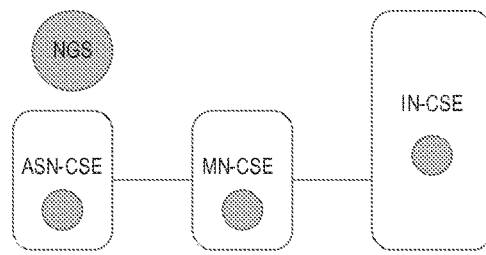
FIG. 19 illustrates a NGS CSF in oneM2M ROA according to another aspect of the application.

FIG. 19 shows another exemplary embodiment where an ASN-CSE negotiates services with an IN-CSE via an MN-CSE in the middle. ASN-CSE's NGS will be the Negotiator, MN-CSE's NGS will be the Negotiation Broker, and IN-CSE's NGS will be the Negotiatee.

New Resources/Attributes to Support NGS CSF

In another embodiment, oneM2M resource structure enhancements to support NGS CSF Service are proposed. OneM2M-defined graphical representation for describing resource structures is the following: (i) Square boxes are used for resources and child resources; (ii) Square boxes with round corners are used for attributes; and (iii) New Resource <ngtn>.

The <ngtn> resource is defined for a M2M entity to issue a Negotiation Request and receive/retrieve Negotiation Response. Each <ngtn> resource corresponds to a specific negotiation request or response between two M2M entities. It maintains information or parameters as contained in Negotiation Request and Negotiation Response messages as illustrated in FIG. 6.

Figure 20:
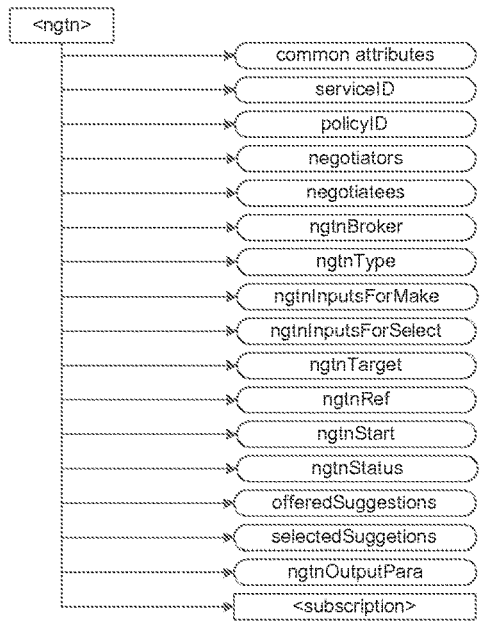
FIG. 20 illustrates a structure of an oneM2M <ngtn> resource according to an aspect of the application.

A<ngtn> has a few attributes and sub-resources as shown in FIG. 20 and Table 4. The parent resource of <ngtn> may be <AE>, <CSEBase>, and/or <remoteCSE>. For example, an IN-AE creates a <ngtn> resource under its <AE> on its hosting CSE, e.g., an M2M server, to initiate the negotiation with its hosting CSE.

For example, an MN-CSE creates a <ngtn> resource under its <remoteCSE> on its hosting CSE, e.g., an M2M server, to initiate the negotiation with its hosting CSE.

Alternatively, negotiation requests from IN-CSE and IN-AE can be all created immediately under their hosting CSE. In this case, <ngtn> will be created as a sub-resource of <CSEBase> of the hosting CSE.

TABLE 4

| Attributes | Description |
| --- | --- |
| common attributes | Stands for the common attributes described in oneM2M-TS-0001, oneM2M Functional Architecture- V1.1.0; August 2014 incorporated by reference in its entirety. |
| serviceID | Indicate the name or identifier of the services to be negotiated via the present negotiation request <ngtn>. |
| policyID | Indicate the URI or the identifier of an existing <ngtnPolicy> resource to be used as policies for the present negotiation request <ngtn>. |
| negotiators | Indicate the address, name, or identifier of all parties that requests and/or initiates the present negotiation request <ngtn>. |
| negotiatees | The address, name, or identifier of all parties that need to make suggestions for the present negotiation request <ngtn>. |
| ngtnBroker | The address, name, or identifier of the negotiation broker involved in the present negotiation request <ngtn>. |
| ngtnType | Indicate the negotiation type of the present negotiation request <ngtn>. For example,<br>ngtnType = 1: stands for negotiations between two CSEs.<br>ngtnType = 2: stands for negotiations between a CSE and an AE<br>ngtnType = 3: stands for negotiations between two AEs. |
| ngtnInputsForMake | Stand for input parameters or information to be used by a Negotiatee or a Negotiation Broker to make suggestions for the present negotiation request <ngtn>. This attribute may consist of a set of parameters as denoted by name/value pair (paraName, paraValue). Here, the paraName stands for the name of a parameter while paraValue stands for the value of this parameter. Note that paraValue could be a true value or a URI pointing to a resource (e.g. a <container>) which stores the value. |
| ngtnInputsForSelect | Stand for input parameters or information to be used by a Negotiator or a Negotiation Broker to select suggestions. This attribute may consist of a set of parameters as denoted by name/value pair (paraName, paraValue). Here, the paraName stands for the name of a parameter while paraValue stands for the value of this parameter. Note that paraValue could be a true value or a URI pointing to a resource (e.g. a <container>) which stores the value. |
| ngtnStart | To start or stop the present negotiation request <ngtn>. If ngtnStart = TRUE, start the present negotiation request <ngtn>; if ngtnStart = FALSE, stop the present negotiation request <ngtn> or do not start it. |
| ngtnStatus | Indicate the current status of the present negotiation request <ngtn>. The status could be PENDING, INITIATED, STOPPED, FINISHED WITH SUCCESS, FINISHED BUT FAILURE. |
| ngtnTarget | Indicates the target or destination that the "selectedSuggestions" will be applied to. It could be a resource on a Negotiatee or a Negotiator, or another M2M entity (e.g. device, gateways, or server), or another CSF. For example, this negotiation could be about data update frequency to a <container> resource on the Negotiatee. As a result, ngtnTarget will be the URI of this <container> resource. |
| ngtnRef | Indicate the reference, pointer, or URI to another existing <ngtn> resource. This attribute is used by a Negotiation Broker to refer the current <ngtn> |

TABLE 4-continued

| Attributes | Description |
| --- | --- |
|  | (e.g. created by a Negotiator) to another <ngtn> (e.g. created for the corresponding Negotiatee). |
| offeredSuggestions | Indicate the suggestions made by a Negotiatee or a Negotiation Broker. This attribute may consist of a set of parameters as denoted by name/value pair (paraName, paraValue). Here, the paraName stands for the name of a parameter while paraValue stands for the value of this parameter. Note that paraValue could be a true value or a URI pointing to a resource (e.g. a <container>) which stores the value. |
| selectedSuggestions | Indicate the selected suggestions by a Negotiator or a Negotiation Broker. This attribute may consist of a set of parameters as denoted by name/value pair (paraName, paraValue). Here, the paraName stands for the name of a parameter while paraValue stands for the value of this parameter. Note that paraValue could be a true value or a URI pointing to a resource (e.g. a <container>) which stores the value. |
| ngtnOutputPara | Indicate the name of parameters whose values will be negotiated using the present negotiation request <ngtn>. |
| <subscription> | It is defined in described in oneM2M-TS-0001, oneM2M Functional Architecture- V1.1.0; August 2014 incorporated by reference in its entirety, which allows the present <ngtn> can be subscribed by other M2M entities. |

According to even another embodiment, a new resource called <ngtnPolicy>, e.g., negotiation policy, is used to specify 1) how a Negotiatee (or its Broker) makes suggestions based on the policy, or to specify 2) how a Negotiator (or its Broker) selects suggestions based on the policy. In other words, there are two types of policies: 1) policies for making suggestions and 2) policies for selecting suggestions. Each negotiation policy needs to contain at least two pieces of information: Conditions and Results. Namely, if "Conditions" are satisfied, "Results" will be the output of the policy. Since there are two types of policies, "Results" could be: 1) suggestions to be made by the Negotiatee or its Broker; or 2) suggestions to be selected by the Negotiator or its Broker.

Figure 21:
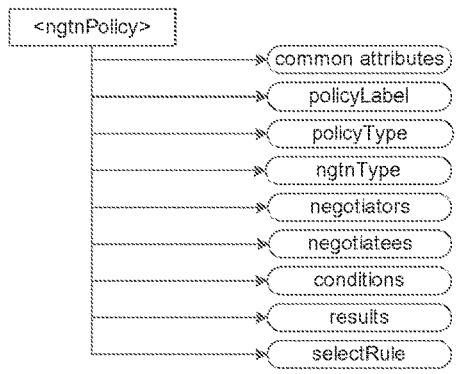
FIG. 21 illustrates a structure of an oneM2M <ngtnPolicy> resource according to an aspect of the application.

<ngtnPolicy> resource has a few attributes and sub-resource as shown in FIG. 21 and Table 5 below. The parent resource of <ngtnPolicy> may be <AE>, <CSEBase>, and/or <remoteCSE>. Note that <AE>, <CSEBase>, and <remoteCSE> are defined in described in oneM2M-TS-0001, oneM2M Functional Architecture-V1.1.0; August 2014 incorporated by reference in its entirety.

TABLE 5

| Attributes | Description |
| --- | --- |
| common attributes | Stands for the common attributes as defined in described in oneM2M-TS-0001, oneM2M Functional Architecture- V1.1.0; August 2014 incorporated by reference in its entirety. |
| policyLabel | The label or description of the present <ngtnPolicy> resource. This attribute may contain ServiceID information, which this <ngtnPolicy> is applicable to. |
| policyType | There are two types of negotiation policies.<br>policyType = 1: negotiation policies to be used by a Negotiatee or a Negotiation Broker to make suggestions.<br>policyType = 2: negotiation policies to be used by a Negotiator or a Negotiation Broker to select suggestions. |
| ngtnType | Indicate the type of a <ngtn> resource for which this policy is applicable. It has the same meaning as a <ngtn>'s ngtnType attribute. |
| negotiators | Indicate the list of Negotiators that the present <ngtnPolicy> is potentially applied to. |
| negotiatees | Indicate the list of Negotiatees that the present <ngtnPolicy> is potentially applied to. |
| conditions | Indicates the conditions under which the present <ngtnPolicy> can be applied or enforced to make suggestions or select suggestion. It basically consists of a set of parameters as denoted by name/value pair (paraName, paraValue). Here, the paraName stands for the name of a parameter while paraValue stands for the value of this parameter.<br>If policyType == 1, this attribute stands for conditions for making suggestions.<br>If policyType == 2, this attribute stands for conditions for selecting suggestions. |
| results | Indicate the corresponding results or decision if "conditions" of this policy is matched. This attribute could stand for offered suggestions or selected suggestions dependent on the value of "policyType". This attribute basically consists of a set of parameters as denoted by name/value two-tuples (paraName, paraValue). Here, the paraName stands for the name of a parameter while paraValue stands for the value of this parameter.<br>If policyType == 1, this attribute stands for offered suggestions if "conditions" is satisfied.<br>If policyType == 2, this attribute stands for selected suggestions if "conditions" is satisfied. |

TABLE 5-continued

| Attributes | Description |
|---|---|
| selectRule | This attribute is only needed when "policyType == 2" (i.e. suggestion selection). Basically, this attribute indicates how to determine or select the final value when paraValue contained in "results" is a range. Its value could be: intersectionAndLowerBound, intersectionAndMedian, intersectionAndUpperBound. |
| <subscription> | It is defined in described in oneM2M-TS-0001, oneM2M Functional Architecture-V1.1.0; August 2014 incorporated by reference in its entirety, which allows the present <ngtn> can be subscribed by other M2M entities. |

Figure 22:
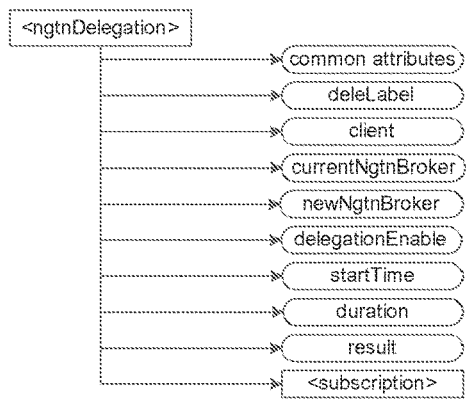
FIG. 22 illustrates a structure of an oneM2M <ngtnDelegation> resource according to an aspect of the application.

According to a further embodiment as shown in FIG. 22 and Table 6 below, a new resource called the 'negotiation resource', e.g., <ngtnDelegation>, is proposed to support negotiation delegation broker function as described above in the application. Each <ngtnDelegation> corresponds to a negotiation broker delegation request. It could be a sub-resource of an <AE>, a <remoteCSE>, or a <CSEBase> resource.

TABLE 6

| Attribute | Description |
|---|---|
| common attributes | Stands for the common attributes as defined in described in oneM2M-TS-0001, oneM2M Functional Architecture- V1.1.0; August 2014 incorporated by reference in its entirety. |
| deleLabel | Indicate the description of this resource. |
| client | Indicate the client (i.e. a Negotiator or a Negotiatee) whose Broker will be delegated. |
| currentNgtnBroker | Indicate the current Negotiation Broker of a Negotiator or a Negotiatee. |
| newNgtnBroker | Indicate the new Negotiation Broker of a Negotiator or a Negotiatee. |
| delegationEnable | To start or stop the present negotiation broker delegation request <ngtnDelegation>. If delegationEnable = TRUE, start the present negotiation broker delegation request <ngtnDelegation>; if delegationEnable = FALSE, stop the present negotiation broker delegation request <ngtnDelegation> or do not start it. |
| startTime | Indicate the start time when the new Negotiation Broker will take in charge. |
| duration | Indicate the time duration within which the new Negotiation Broker will take in charge. |
| result | Indicate the result of this negotiation broker delegation. It could be successful or failed. |
| <subscription> | It is defined in described in oneM2M-TS-0001, oneM2M Functional Architecture- V1.1.0; August 2014 incorporated by reference in its entirety, which allows the present <ngtn> can be subscribed by other M2M entities. |

A new attribute 'ngtnBroker' is proposed as a new attribute of an <AE> or a <remoteCSE> resource. Note that <AE>, <CSEBase>, and <remoteCSE> are defined in described in oneM2M-TS-0001, oneM2M Functional Architecture-V1.1.0; August 2014 incorporated by reference in its entirety. If ngtnBroker is an attribute of an <AE> resource, it indicates <AE>'s Negotiation Brokers. If ngtnBroker is an attribute of a <remoteCSE> resource, it indicates <remoteCSE>'s Negotiation Brokers.

TABLE 7

| Attribute | Description |
|---|---|
| ngtnBroker | Indicate name, address, and URI of a Negotiation Broker. |

CsfBitMap is proposed as a new attribute of an <AE>, a <CSEBase> or a <remoteCSE> resource. Note that <AE>, <CSEBase>, and <remoteCSE> are described in oneM2M-TS-0001, oneM2M Functional Architecture-V1.1.0; August 2014 incorporated by reference in its entirety. If csfBitMap is an attribute of an <AE> resource, it means the list of CSFs that the <AE> requests to use, and/or the list of CSFs that are approved by the <AE>'s hosting CSE. When an AE registers itself with its hosting CSE, the AE may contain csfBitMap in the application registration request message to indicate its desired CSFs; in turn, the hosting CSE may return back an approved csfBitMap to indicate the approved CSFs being allocated to the AE.

If csfBitMap is an attribute of a <remoteCSE> resource, it means the list of CSFs that the <remoteCSE> requests to use, and/or the list of CSFs that are approved by the <remoteCSE>'s hosting CSE. When a CSE registers itself with its hosting CSE, the CSE may contain csfBitMap in the CSE registration request message to indicate its desired CSFs; in turn, the hosting CSE may return back an approved csfBitMap to indicate the approved CSFs being allocated to the CSE. If csfBitMap is an attribute of a <CSEBase>, it means the list of CSFs that this CSE possesses.

TABLE 8

| Attribute | Description |
|---|---|
| csfBitMap | Indicate the status of each individual CSF |

Resource Procedures to Support NGS CSF

The protocols provided in Table 9 below are employed for creating the <ngtn> resource. In particular, this procedure shall be used to create a specific <ngtn> resource in the hosting CSE.

TABLE 9

| <ngtn> CREATE | |
|---|---|
| Associated Reference Point | Mcc and Mca |
| Information in Request message | op: C<br>fr: Identifier of the AE or the CSE that initiates the Request<br>to: The URI of the <AE>, <remoteCSE>, or <CSEBase> where the <ngtn> resource is intended to be Created<br>cn: The representation of the <ngtn> resource for which the attributes are described. |

TABLE 9-continued

| <ngtn> CREATE | |
|---|---|
| Processing at Originator before sending Request | According to clause 10.1.1.1 in oneM2M-TS-0001, oneM2M Functional Architecture-V1.1.0; August 2014 incorporated by reference in its entirety.. |
| Processing at Receiver | According to clause 10.1.1.1 in oneM2M-TS-0001, oneM2M Functional Architecture-V1.1.0; August 2014 incorporated by reference in its entirety. |
| Information in Response message | All parameters defined in table 8.1.2.1-1 in oneM2M-TS-0001, oneM2M Functional Architecture-V1.1.0; August 2014 incorporated by reference in its entirety, apply with the specific details for:<br>cn: URI of the created <ngtn> resource, according to clause 10.1.1.1 described in oneM2M-TS-0001, oneM2M Functional Architecture-V1.1.0; August 2014 incorporated by reference in its entirety. |
| Processing at Originator after receiving Response | According to clause 10.1.1.1 in described in oneM2M-TS-0001, oneM2M Functional Architecture-V1.1.0; August 2014 incorporated by reference in its entirety. |
| Exceptions | According to clause 10.1.1.1 in described in oneM2M-TS-0001, oneM2M Functional Architecture-V1.1.0; August 2014 incorporated by reference in its entirety. |

Moreover, the protocols in Table 10 shall be used to retrieve information from an existing <ngtn> resource.

TABLE 10

| <ngtn> RETRIEVE | |
|---|---|
| Associated Reference Point | Mcc and Mca |
| Information in Request message | op: R<br>fr: Identifier of the AE or the CSE that initiates the Request<br>to: The URI of the <ngtn> resource<br>cn: void |
| Processing at Originator before sending Request | According to clause 10.1.2 described in oneM2M-TS-0001, oneM2M Functional Architecture-V1.1.0; August 2014 incorporated by reference in its entirety. |
| Processing at Receiver | According to clause 10.1.2 described in oneM2M-TS-0001, oneM2M Functional Architecture-V1.1.0; August 2014 incorporated by reference in its entirety. |
| Information in Response message | All parameters defined in Table 8.1.2.1-1 described in oneM2M-TS-0001, oneM2M Functional Architecture-V1.1.0; August 2014 incorporated by reference in its entirety, apply with the specific details for:<br>cn: attributes of the <ngtn> resource as defined in Table 4. |
| Processing at Originator after receiving Response | According to clause 10.1.2 described in oneM2M-TS-0001, oneM2M Functional Architecture-V1.1.0; August 2014 incorporated by reference in its entirety. |
| Exceptions | According to clause 10.1.2 described in oneM2M-TS-0001, oneM2M Functional Architecture-V1.1.0; August 2014 incorporated by reference in its entirety. |

The protocols below in Table 11 are employed to update information of an existing <ngtn> resource.

TABLE 11

| <ngtn> UPDATE | |
|---|---|
| Associated Reference Point | Mcc and Mca |
| Information in Request message | op: U<br>fr: Identifier of the AE or the CSE that initiates the Request<br>to: The URI of the <ngtn> resource<br>cn: The representation of the <ngtn> resource for which the attributes. |
| Processing at Originator before sending Request | According to clause 10.1.3 described in oneM2M-TS-0001, oneM2M Functional Architecture-V1.1.0; August 2014 incorporated by reference in its entirety. |
| Processing at Receiver | According to clause 10.1.3 described in oneM2M-TS-0001, oneM2M Functional Architecture-V1.1.0; August 2014 incorporated by reference in its entirety. |
| Information in Response message | According to clause 10.1.3 described in oneM2M-TS-0001, oneM2M Functional Architecture-V1.1.0; August 2014 incorporated by reference in its entirety. |
| Processing at Originator after receiving Response | According to clause 10.1.3 described in oneM2M-TS-0001, oneM2M Functional Architecture-V1.1.0; August 2014 incorporated by reference in its entirety. |
| Exceptions | According to clause 10.1.3 described in oneM2M-TS-0001, oneM2M Functional Architecture-V1.1.0; August 2014 incorporated by reference in its entirety. |

The protocols provided in Table 12 below shall be used to delete an existing <ngtn> resource.

TABLE 12

<ngtn> DELETE

| | |
|---|---|
| Associated Reference Point | Mcc and Mca |
| Information in Request message | op: D<br>fr: Identifier of the AE or the CSE that initiates the Request<br>to: The URI of the <ngtn> resource. |
| Processing at Originator before sending Request | According to clause 10.1.4 described in oneM2M-TS-0001, oneM2M Functional Architecture-V1.1.0; August 2014 incorporated by reference in its entirety. |
| Processing at Receiver | According to clause 10.1.4 described in oneM2M-TS-0001, oneM2M Functional Architecture-V1.1.0; August 2014 incorporated by reference in its entirety. |
| Information in Response message | According to clause 10.1.4 described in oneM2M-TS-0001, oneM2M Functional Architecture-V1.1.0; August 2014 incorporated by reference in its entirety. |
| Processing at Originator after receiving Response | According to clause 10.1.4 described in oneM2M-TS-0001, oneM2M Functional Architecture-V1.1.0; August 2014 incorporated by reference in its entirety. |
| Exceptions | According to clause 10.1.4 described in oneM2M-TS-0001, oneM2M Functional Architecture-V1.1.0; August 2014 incorporated by reference in its entirety. |

The protocols provided below in Table 13 shall be used to execute a pending negotiation request <ngtn> on the hosting CSE.

TABLE 13

<ngtn> EXECUTE

| | |
|---|---|
| Associated Reference Point | Mcc and Mca |
| Information in Request message | op: U<br>fr: Identifier of the AE or the CSE that initiates the Request<br>to: The URI of the <ngtn>/ngtnStart.<br>cn: ngtnStart = TRUE |
| Processing at Originator before sending Request | The Originator shall request to execute a <ngtn> by using an UPDATE operation on its attribute ngtnStart. The cn parameter shall be included with the name of such attribute(s) with predefined value(s) to trigger the respective action.<br>After the execution request, the Originator shall request to retrieve the execution result or status from the executable <ngtn> resource or its attribute/child resource by using a RETRIEVE operation. |
| Processing at Receiver | For the EXECUTE operation, the Receiver, if it is the Negotiatee, shall:<br>Check if the Originator has the WRITE privilege on the addressed <ngtn> resource or its attribute.<br>Update <ngtn>/ngtnStatus.<br>Make suggestions according to its local negotiation policies.<br>Update <ngtn>/offeredSuggestions based on the suggestions just made.<br>Update <ngtn>/ngtnStatus.<br>Respond to the Originator with the appropriate response based on updated attributes of <ngtn>.<br>For the EXECUTE operation, the Receiver, if it is the Negotiation Broker for the Originator only, shall:<br>Check if the Originator has the WRITE privilege on the addressed <ngtn> resource or its attribute.<br>Update <ngtn>/ngtnStatus.<br>Contact the Negotiatee to execute another <ngtn> on the Negotiatee.<br>Wait for response from the Negotiatee.<br>Update <ngtn>/offeredSuggestions based on the response received from the Negotiatee.<br>Select suggestions according to its local negotiation policies and offeredSuggestions received from the Negotiatee.<br>Update <ngtn>/selectedSuggestions based on the suggestions just selected.<br>Update <ngtn>/ngtnStatus.<br>Respond to the Originator with the appropriate response based on updated attributes of <ngtn>.<br>For the EXECUTE operation, the Receiver, if it is the Negotiation Broker for the Negotiatee only, shall:<br>Check if the Originator has the WRITE privilege on the addressed <ngtn> resource or its attribute.<br>Update <ngtn>/ngtnStatus.<br>Make suggestions according to its local negotiation policies.<br>Update <ngtn>/offeredSuggestions based on the suggestions just made.<br>Update <ngtn>/ngtnStatus.<br>Respond to the Originator with the appropriate response based on updated attributes of <ngtn>.<br>Send a notification to the Negotiatee with the appropriate response based on updated attributes of <ngtn>.<br>For the EXECUTE operation, the Receiver, if it is the Negotiation Broker for both the Originator and the Negotiatee, shall: |

TABLE 13-continued

<ngtn> EXECUTE

| | |
|---|---|
| | Check if the Originator has the WRITE privilege on the addressed <ngtn> resource or its attribute.<br>Update <ngtn>/ngtnStatus.<br>Make suggestions according to its local negotiation policies.<br>Update <ngtn>/offeredSuggestions based on the suggestions just made.<br>Select suggestions according to its local negotiation policies and offeredSuggestions received from the Negotiatee.<br>Update <ngtn>/selectedSuggestions based on the suggestions just selected.<br>Update <ngtn>/ngtnStatus.<br>Respond to the Originator with the appropriate response based on updated attributes of <ngtn>.<br>Send a notification to the Negotiatee with the appropriate response based on updated attributes of <ngtn>. |
| Information in Response message | All parameters defined in table 8.1.2.1-1 described in oneM2M-TS-0001, oneM2M Functional Architecture-V1.1.0; August 2014 incorporated by reference in its entirety.apply with the specific details for:<br>cn: attributes of the <ngtn> resource as defined in Table 4. |
| Processing at Originator after receiving Response | If the Originator as the Negotiator receives the Response directly from its Negotiatee:<br>Select appropriate suggestions from the received offeredSuggestions according to its local negotiation policies.<br>Update <ngtn>/selectedSuggestions using UPDATE operation.<br>If the Originator as the Negotiator receives the Response from its own Broker:<br>None<br>If the Originator as the Negotiator receives the Response from the Negotiatee's Broker:<br>Select appropriate suggestions from the received offeredSuggestions according to its local negotiation policies.<br>Update <ngtn>/selectedSuggestions using UPDATE operation. |
| Exceptions | According to clause 10.1.3 described in oneM2M-TS-0001, oneM2M Functional Architecture-V1.1.0; August 2014 incorporated by reference in its entirety. |

The protocols provided in Table 14 below shall be used to create a specific <ngtnPolicy> resource in the hosting CSE.

TABLE 14

<ngtnPolicy> CREATE

| | |
|---|---|
| Associated Reference Point | Mcc and Mca |
| Information in Request message | op: C<br>fr: Identifier of the AE or the CSE that initiates the Request<br>to: The URI of the <AE>, <remoteCSE>, or <CSEBase> where the <ngtnPolicy> resource is intended to be Created<br>cn: The representation of the <ngtnPolicy> resource for which the attributes. |
| Processing at Originator before sending Request | According to clause 10.1.1.1 described in oneM2M-TS-0001, oneM2M Functional Architecture-V1.1.0; August 2014 incorporated by reference in its entirety. |
| Processing at Receiver | According to clause 10.1.1.1 described in oneM2M-TS-0001, oneM2M Functional Architecture-V1.1.0; August 2014 incorporated by reference in its entirety. |
| Information in Response message | All parameters defined in table 8.1.2.1-1 described in oneM2M-TS-0001, oneM2M Functional Architecture-V1.1.0; August 2014 incorporated by reference in its entirety.<br>apply with the specific details for:<br>cn: URI of the created <ngtnPolicy> resource, according to clause 10.1.1.1 described in oneM2M-TS-0001, oneM2M Functional Architecture-V1.1.0; August 2014 incorporated by reference in its entirety. |
| Processing at Originator after receiving Response | According to clause 10.1.1.1 described in oneM2M-TS-0001, oneM2M Functional Architecture-V1.1.0; August 2014 incorporated by reference in its entirety. |
| Exceptions | According to clause 10.1.1.1 described in oneM2M-TS-0001, oneM2M Functional Architecture-V1.1.0; August 2014 incorporated by reference in its entirety. |

The procedure provided in Table 15 below shall be used to retrieve information from an existing <ngtnPolicy> resource.

TABLE 15

<ngtnPolicy> RETRIEVE

| | |
|---|---|
| Associated Reference Point | Mcc and Mca |
| Information in Request message | op: R<br>fr: Identifier of the AE or the CSE that initiates the Request<br>to: The URI of the <ngtnPolicy> resource<br>cn: void |

TABLE 15-continued

| <ngtnPolicy> RETRIEVE | |
|---|---|
| Processing at Originator before sending Request | According to clause 10.1.2 described in oneM2M-TS-0001, oneM2M Functional Architecture-V1.1.0; August 2014 incorporated by reference in its entirety. |
| Processing at Receiver | According to clause 10.1.2 described in oneM2M-TS-0001, oneM2M Functional Architecture-V1.1.0; August 2014 incorporated by reference in its entirety. |
| Information in Response message | All parameters defined in table 8.1.2.1-1 described in oneM2M-TS-0001, oneM2M Functional Architecture-V1.1.0; August 2014 incorporated by reference in its entirety.apply with the specific details for:<br>cn: attributes of the <ngtnPolicy> resource. |
| Processing at Originator after receiving Response | According to clause 10.1.2 described in oneM2M-TS-0001, oneM2M Functional Architecture-V1.1.0; August 2014 incorporated by reference in its entirety. |
| Exceptions | According to clause 10.1.2 described in oneM2M-TS-0001, oneM2M Functional Architecture-V1.1.0; August 2014 incorporated by reference in its entirety. |

The procedure provided in Table 16 below shall be used to update information of an existing <ngtnPolicy> resource.

TABLE 16

| <ngtnPolicy> UPDATE | |
|---|---|
| Associated Reference Point | Mcc and Mca |
| Information in Request message | op: U<br>fr: Identifier of the AE or the CSE that initiates the Request<br>to: The URI of the <ngtnPolicy> resource<br>cn: The representation of the <ngtnPolicy> resource for which the attributes. |
| Processing at Originator before sending Request | According to clause 10.1.3 described in oneM2M-TS-0001, oneM2M Functional Architecture-V1.1.0; August 2014 incorporated by reference in its entirety. |
| Processing at Receiver | According to clause 10.1.3 described in oneM2M-TS-0001, oneM2M Functional Architecture-V1.1.0; August 2014 incorporated by reference in its entirety. |
| Information in Response message | According to clause 10.1.3 described in oneM2M-TS-0001, oneM2M Functional Architecture-V1.1.0; August 2014 incorporated by reference in its entirety. |
| Processing at Originator after receiving Response | According to clause 10.1.3 described in oneM2M-TS-0001, oneM2M Functional Architecture-V1.1.0; August 2014 incorporated by reference in its entirety. |
| Exceptions | According to clause 10.1.3 described in oneM2M-TS-0001, oneM2M Functional Architecture-V1.1.0; August 2014 incorporated by reference in its entirety. |

The protocol in Table 17 below shall be used to delete an existing <ngtnPolicy> resource.

TABLE 17

| <ngtnPolicy> DELETE | |
|---|---|
| Associated Reference Point | Mcc and Mca |
| Information in Request message | op: D<br>fr: Identifier of the AE or the CSE that initiates the Request<br>to: The URI of the <ngtnPolicy> resource. |
| Processing at Originator before sending Request | According to clause 10.1.4 described in oneM2M-TS-0001, oneM2M Functional Architecture-V1.1.0; August 2014 incorporated by reference in its entirety. |
| Processing at Receiver | According to clause 10.1.4 described in oneM2M-TS-0001, oneM2M Functional Architecture-V1.1.0; August 2014 incorporated by reference in its entirety. |
| Information in Response message | According to clause 10.1.4 described in oneM2M-TS-0001, oneM2M Functional Architecture-V1.1.0; August 2014 incorporated by reference in its entirety. |
| Processing at Originator after receiving Response | According to clause 10.1.4 described in oneM2M-TS-0001, oneM2M Functional Architecture-V1.1.0; August 2014 incorporated by reference in its entirety. |
| Exceptions | According to clause 10.1.4 described in oneM2M-TS-0001, oneM2M-TS-0001, oneM2M Functional Architecture-V1.1.0; August 2014 incorporated by reference in its entirety. |

The procedure in Table 18 below shall be used to create a specific <ngtnDelegation> resource in the hosting CSE.

TABLE 18

| <ngtnDelegation> CREATE | |
|---|---|
| Associated Reference Point | Mcc and Mca |
| Information in Request message | op: C<br>fr: Identifier of the AE or the CSE that initiates the Request<br>to: The URI of the <AE>, <remoteCSE>, or <CSEBase> where the <ngtnDelegation> resource is intended to be Created<br>cn: The representation of the <ngtnDelegation> resource for which the attributes are described in. |
| Processing at Originator before sending Request | According to clause 10.1.1.1 described in oneM2M-TS-0001, oneM2M Functional Architecture-V1.1.0; August 2014 incorporated by reference in its entirety. |
| Processing at Receiver | According to clause 10.1.1.1 described in oneM2M-TS-0001, oneM2M Functional Architecture-V1.1.0; August 2014 incorporated by reference in its entirety. |
| Information in Response message | All parameters defined in table 8.1.2.1-1 described in oneM2M-TS-0001, oneM2M Functional Architecture-V1.1.0; August 2014 incorporated by reference in its entirety. apply with the specific details for:<br>cn: URI of the created <ngtnDelegation> resource, according to clause 10.1.1.1 described in oneM2M-TS-0001, oneM2M Functional Architecture-V1.1.0; August 2014 incorporated by reference in its entirety. |
| Processing at Originator after receiving Response | According to clause 10.1.1.1 described in oneM2M-TS-0001, oneM2M Functional Architecture-V1.1.0; August 2014 incorporated by reference in its entirety. |
| Exceptions | According to clause 10.1.1.1 described in oneM2M-TS-0001, oneM2M Functional Architecture-V1.1.0; August 2014 incorporated by reference in its entirety. |

The protocol in Table 19 below shall be used to retrieve information from an existing <ngtnDelegation> resource.

TABLE 19

| <ngtnDelegation> RETRIEVE | |
|---|---|
| Associated Reference Point | Mcc and Mca |
| Information in Request message | op: R<br>fr: Identifier of the AE or the CSE that initiates the Request<br>to: The URI of the <ngtnDelegation> resource<br>cn: void |
| Processing at Originator before sending Request | According to clause 10.1.2 described in oneM2M-TS-0001, oneM2M Functional Architecture-V1.1.0; August 2014 incorporated by reference in its entirety. |
| Processing at Receiver | According to clause 10.1.2 described in oneM2M-TS-0001, oneM2M Functional Architecture-V1.1.0; August 2014 incorporated by reference in its entirety. |
| Information in Response message | All parameters defined in table 8.1.2.1-1 described in oneM2M-TS-0001, oneM2M Functional Architecture-V1.1.0; August 2014 incorporated by reference in its entirety.<br>cn: attributes of the <ngtnDelegation> resource. |
| Processing at Originator after receiving Response | According to clause 10.1.2 described in oneM2M-TS-0001, oneM2M Functional Architecture-V1.1.0; August 2014 incorporated by reference in its entirety. |
| Exceptions | According to clause 10.1.2 described in oneM2M-TS-0001, oneM2M Functional Architecture-V1.1.0; August 2014 incorporated by reference in its entirety. |

The protocols in Table 20 below shall be used to update information of an existing <ngtnDelegation> resource.

TABLE 20

| <ngtnDelegation> UPDATE | |
|---|---|
| Associated Reference Point | Mcc and Mca |
| Information in Request message | op: U<br>fr: Identifier of the AE or the CSE that initiates the Request<br>to: The URI of the <ngtnDelegation> resource<br>cn: The representation of the <ngtnDelegation> resource for which the attributes. |
| Processing at Originator before sending Request | According to clause 10.1.3 described in oneM2M-TS-0001, oneM2M Functional Architecture-V1.1.0; August 2014 incorporated by reference in its entirety. |
| Processing at Receiver | According to clause 10.1.3 described in oneM2M-TS-0001, oneM2M Functional Architecture-V1.1.0; August 2014 incorporated by reference in its entirety. |
| Information in Response message | According to clause 10.1.3 described in oneM2M-TS-0001, oneM2M Functional Architecture-V1.1.0; August 2014 incorporated by reference in its entirety. |
| Processing at Originator after receiving Response | According to clause 10.1.3 described in oneM2M-TS-0001, oneM2M Functional Architecture-V1.1.0; August 2014 incorporated by reference in its entirety. |
| Exceptions | According to clause 10.1.3 described in oneM2M-TS-0001, oneM2M Functional Architecture-V1.1.0; August 2014 incorporated by reference in its entirety. |

The protocols in Table 21 below shall be used to delete an existing <ngtnDelegation> resource.

Figure 23:
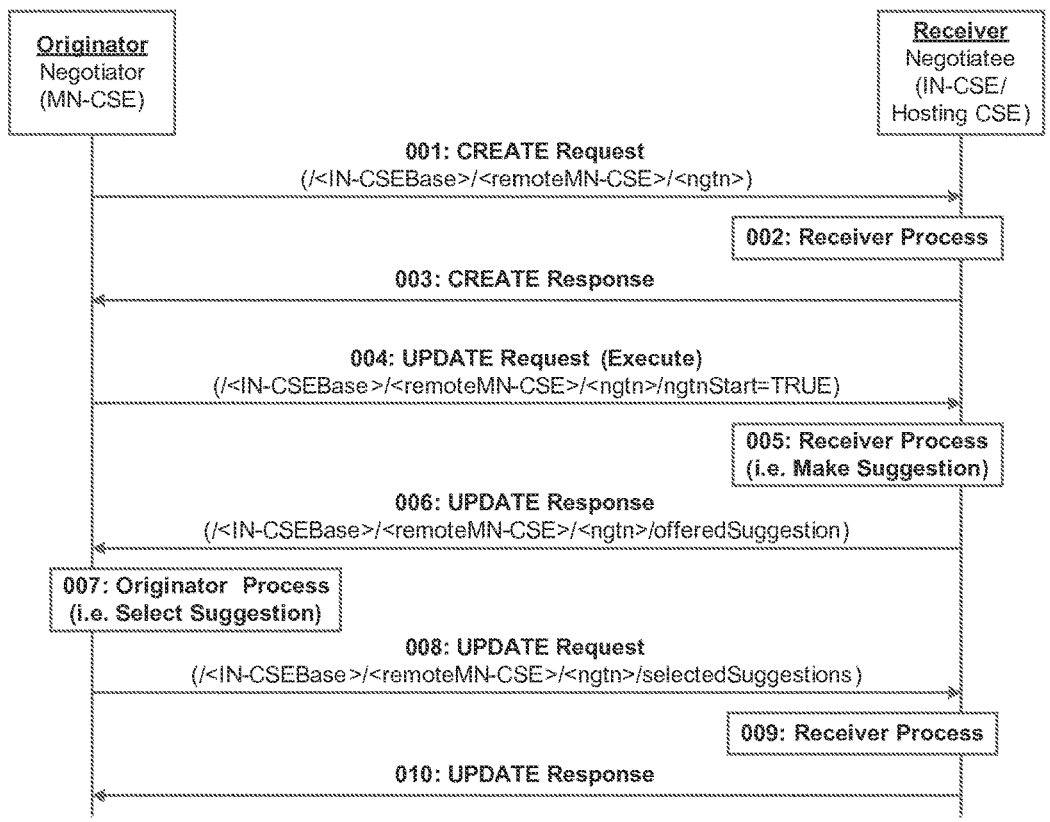
FIG. 23 illustrates an exemplary embodiment of a service negotiation between MN-CSE and IN-CSE according to an aspect of the application.

FIG. 23 illustrates an example of service negotiation using the proposed procedures described above. Each of the

TABLE 21

| <ngtnDelegation> DELETE | |
| --- | --- |
| Associated Reference Point | Mcc and Mca |
| Information in Request message | op: D<br>fr: Identifier of the AE or the CSE that initiates the Request<br>to: The URI of the <ngtnDelegation> resource. |
| Processing at Originator before sending Request | According to clause 10.1.4 described in oneM2M-TS-0001, oneM2M Functional Architecture-V1.1.0; August 2014 incorporated by reference in its entirety. |
| Processing at Receiver | According to clause 10.1.4 described in oneM2M-TS-0001, oneM2M Functional Architecture-V1.1.0; August 2014 incorporated by reference in its entirety. |
| Information in Response message | According to clause 10.1.4 described in oneM2M-TS-0001, oneM2M Functional Architecture-V1.1.0; August 2014 incorporated by reference in its entirety. |
| Processing at Originator after receiving Response | According to clause 10.1.4 described in oneM2M-TS-0001, oneM2M Functional Architecture-V1.1.0; August 2014 incorporated by reference in its entirety. |
| Exceptions | According to clause 10.1.4 described in oneM2M-TS-0001, oneM2M Functional Architecture-V1.1.0; August 2014 incorporated by reference in its entirety. |

The protocols in Table 22 below shall be used to execute a pending negotiation broker delegation request <ngtnDelegation> on the hosting CSE.

steps is provided in Roman numeral format, e.g., 001, 002, etc. Here, the MN-CSE is the Negotiator, and the IN-CSE is the Negotiatee. According to Step 1, MN-CSE issues a

TABLE 22

| <ngtn> EXECUTE | |
| --- | --- |
| Associated Reference Point | Mcc and Mca |
| Information in Request message | op: U<br>fr: Identifier of the AE or the CSE that initiates the Request<br>to: The URI of the <ngtnDelegation>/delegationEnable.<br>cn: delegationEnable = TRUE |
| Processing at Originator before sending Request | The Originator shall request to execute a <ngtnDelegation> by using an UPDATE operation on its attribute delegationEnable. The cn parameter shall be included with the name of such attribute(s) with predefined value(s) to trigger the respective action. After the execution request, the Originator shall request to retrieve the execution result or status from the executable <ngtnDelegation> resource or its attribute/child resource by using a RETRIEVE operation. |
| Processing at Receiver | For the EXECUTE operation, the Receiver, if it is the current Negotiation Broker, shall:<br>Check if the Originator has the WRITE privilege on the addressed <ngtnDelegation> resource or its attribute.<br>Contact the new Negotiation Broker to create a new <ngtnDelegationNew> resource on it by using a CREATE operation.<br>Contact the new Negotiation Broker to execute the just created <ngtnDelegationNew><br>Wait for response from the new Negotiation Broker.<br>Update <ngtnDelegation>/result based on the suggestions just selected.<br>Respond to the Originator with the appropriate response based on updated attributes of <ngtnDelegation>.<br>For the EXECUTE operation, the Receiver, if it is the new Negotiation Broker, shall:<br>Check if the Originator has the WRITE privilege on the addressed <ngtnDelegation> resource or its attribute.<br>Check if it is satisfied with the proposed delegation including the startTime and duration.<br>Update <ngtnDelegation>/result.<br>Respond to the Originator with the appropriate response based on updated attributes of <ngtnDelegation>. |
| Information in Response message | All parameters defined in Table 8.1.2.1-1 described in oneM2M-TS-0001, oneM2M Functional Architecture-V1.1.0; August 2014 incorporated by reference in its entirety.apply with the specific details for:<br>cn: attributes of the <ngtnDelegation> resource as defined in Table 6. |
| Processing at Originator after receiving Response | If the Originator as the current Negotiation Broker receives the Response from the new Negotiation Broker:<br>Send a notification to the Negotiator with the appropriate response based on updated attributes of <ngtnDelegation>.<br>If the Originator as the Negotiator receives the Response from its current Negotiation Broker:<br>None |
| Exceptions | According to clause 10.1.3 described in oneM2M-TS-0001, oneM2M Functional Architecture-V1.1.0; August 2014 incorporated by reference in its entirety. |

CREATE request. This is similar to Step 1 in FIG. 6. Next in Step 2, IN-CSE processes the CREATE request. Then in Step 3, IN-CSE sends a CREATE response to MN-CSE. Thereafter, in Step 4, MN-CSE issues a special UPDATE request to execute the created <ngtn> as described above. This is similar to Step 1 in FIG. 6. Subsequently in Step 5, IN-CSE processes the UPDATE request to make suggestions. This is similar to Step 2 in FIG. 6.

The IN-CSE sends a UPDATE response to MN-CSE in Step 6. This is similar to Step 3 in FIG. 6. In Step 7, MN-CSE processes the UPDATE response to select appropriate suggestions. This is similar to Step 4 in FIG. 6. Then in Step 8, MN-CSE issues a normal UPDATE request to update <ngtn>/selected Suggestions as described above. This is similar to Step 5 in FIG. 6. Then in Step 9, IN-CSE processes the UPDATE request to confirm the selected suggestions. Further, in Step 10: IN-CSE sends a UPDATE response to MN-CSE. This is similar to Step 6 in FIG. 6.

Figure 24:
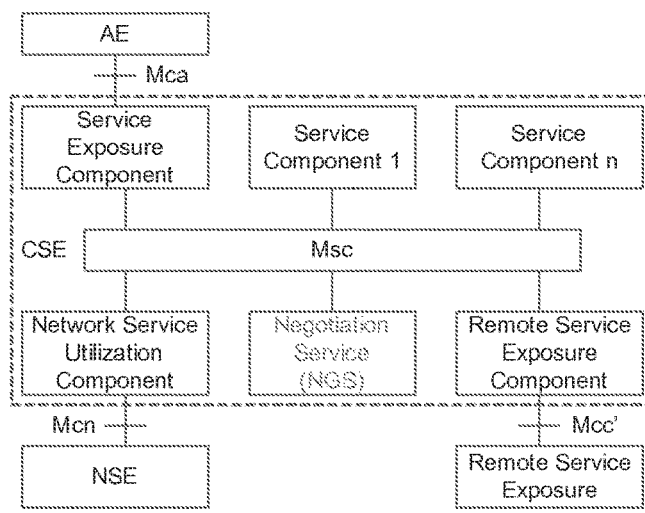
FIG. 24 illustrates an exemplary embodiment of a negotiation service added into an oneM2M service-oriented architecture (SOA).

FIG. 24 illustrates an embodiment of proposed Negotiation Service in the oneM2M SoA architecture as provided in oneM2M-TS-0007, oneM2M Service Component Architecture-V-0.4.0, incorporated in its entirety by reference, where Negotiation Service is inserted as a new service component. Other service components could communicate with negotiation service through Msc reference point. Note that the NGS can be applied to Mca reference point and the proposed data structure and messages in this disclosure can be applied to SOA architecture as well.

In an applicable use case according to the application a M2M service operator, e.g., AT&T, deploys a smart transportation M2M service platform consisting of various M2M servers. Each M2M server provides a suite of services such as DMG for device management. A car rental company, e.g., Hertz, has used this platform to manage its vehicles. Now, the car company wants to put more new hybrid cars into the market. The new hybrid car needs more diagnostic and monitoring function from device management perspective. Due to this new requirement and the number of new cars to be managed, the car company's M2M application negotiates with the operator about the desired DMG functionalities, e.g., more advanced diagnostic function, group device management, more frequent location updates for these new cars, etc.

In another use case an M2M service operator, e.g., Google, deploys a smart home M2M service platform which consists of M2M servers in the cloud and M2M gateways, e.g., Google's NEST, at customer's home. Both M2M server and M2M gateway provide a suite of services such as DMR for data management. A customer used to use M2M gateway to store sensor data, e.g., from cameras installed at home, locally. It is the summer time now and the customer plans to travel around and will leave the home for one month. The customer needs to access camera data via his smart phone and more frequently than before. The customer also likes to receive automatic notification from the operator's service platform if the camera detects any anomaly. The customer's M2M application on his smart phone negotiates with the operator's service platform about whether and how to store/analyze the camera data in the cloud instead of at home's M2M gateway, in order to meet his new needs. It is understood that the functionality of the NGS, may be implemented in the form of software (i.e., computer-executable instructions) stored in a memory of, and executing on a processor of, a node of an M2M network (e.g., a server, gateway, device, or other computer system).

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 6-14 and 23. The computer executable instructions may be stored in a memory and executed by a processor disclosed above in FIGS. 4C and 4D, and employed in devices including M2M devices and servers. In one embodiment, a computer-implemented UE having a non-transitory memory and processor operably coupled thereto, as described above in FIGS. 4C and 4D, is disclosed. Specifically, the apparatus includes a non-transitory memory having a negotiation service layer having instructions stored thereon for negotiating a service attribute.

A further aspect of the application describes a computer-implemented, networked system. The network includes a negotiator and a negotiatee. Each of the negotiator and negotiatee includes a transceiver for sending and receiving data. Each of the negotiator and negotiatee also includes a non-transitory memory having a negotiation service layer with instructions stored thereon for negotiating a service layer attribute. Each of the negotiator and negotiatee also includes a processor, operably coupled to the non-transitory memory, configured to perform a negotiation of the service layer attribute. According to an embodiment, the memory of the negotiator and negotiate includes a resource selected from a negotiation resource, policy resource, a delegation resource and combinations thereof.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A computer-implemented apparatus comprising:
 a non-transitory memory including instructions stored thereon for a negotiation service layer for negotiating a service attribute; and
 a processor, operably coupled to the non-transitory memory, configured to perform the instructions of:
 reviewing the attribute received from a negotiatee;

sending a negotiation request to the negotiatee based upon the reviewed attribute; and receiving an offered suggestion from the negotiatee, wherein the negotiation request includes proposed suggestions indicating a way a service being negotiated with the negotiatee will be used, and wherein the offered suggestion is selected from the proposed suggestions based on one or more negotiation polices, and wherein each of the one or more negotiation policies includes one or more of common attributes, negotiation type, negotiator, negotiatee, service identifier, condition, and result.

2. The computer-implemented apparatus of claim 1, wherein the processor is further configured to select the offered suggestion.

3. The computer-implemented apparatus of claim 2, wherein the selection is checked against predetermined negotiation policies of the negotiatee.

4. The computer-implemented apparatus of claim 1, wherein the step of sending the negotiation request is sent via a broker to the negotiatee, and the step of receiving the offered suggestion is received via the broker from the negotiatee.

5. The computer-implemented apparatus of claim 1, further comprising:

a display including a graphical user interface operably connected to the memory and the processor, the graphical user interface configured to display the offered suggestion.

6. The computer-implemented apparatus of claim 5, wherein the offered suggestion on the display includes information selected from a suggestion, recommendation to negotiate with another negotiatee, and combinations thereof.

7. A computer-implemented apparatus comprising:

a non-transitory memory including instructions stored thereon for a negotiation service layer for negotiating a service attribute; and a processor, operably coupled to the non-transitory memory, configured to perform the instructions of:

receiving a policy for negotiating the attribute from a negotiatee;

receiving a request from a negotiator to negotiate the attribute;

receiving an offered suggestion from the negotiatee; and determining whether the request complies with criteria of the negotiatee policy, wherein the request includes proposed suggestions indicating a way a service being negotiated with the negotiatee will be used, and wherein the offered suggestion is selected from the proposed suggestions based on one or more negotiation polices, and wherein each of the one or more negotiation policies includes one or more of common attributes, negotiation type, negotiator, negotiatee, service identifier, condition, and result.

8. The computer-implemented apparatus of claim 7, wherein the processor is further configured to send an offered suggestion to the negotiator.

9. The computer-implemented apparatus of claim 7, wherein the non-transitory memory stores a negotiation resource selected from common attributes, create, retrieve, delete, update, execute, label, broker, type, inputs for making a suggestion, inputs for selecting a suggestion, start, status, target, reference, offered suggestions, selected suggestions, output parameters, subscription and combinations thereof, and the processor employs the negotiation resource to negotiate the attribute.

10. The computer-implemented apparatus of claim 7, wherein the memory stores a delegation resource selected from common attributes, label, client, current negotiation broker, new negotiation broker, delegation enable, start time, duration, result, subscription and combinations thereof, and the processor employs the delegation resource to negotiate the attribute.

11. A networked system comprising:

a computer-implemented negotiator and a computer-implemented negotiatee, each of the negotiator and the negotiatee including:

a transceiver for sending and receiving data;

a non-transitory memory having a negotiation service layer with instructions stored thereon for negotiating a service layer attribute, and a processor, operably coupled to the non-transitory memory, configured to perform a negotiation of the service layer attribute, wherein the negotiation of the service layer attribute includes a request and an offered suggestion, wherein the request includes proposed suggestions indicating a way a service being negotiated with the negotiatee will be used, and wherein the offered suggestion is selected from the proposed suggestions based on one or more negotiation polices, and wherein each of the one or more negotiation policies includes one or more of common attributes, negotiation type, negotiator, negotiatee, service identifier, condition, and result.

12. The networked system of claim 11, wherein the processor is configured to perform the instructions of:

receiving a policy for negotiating the attribute from a negotiatee;

receiving a request from a negotiator to negotiate the attribute; and determining whether the request complies with criteria of the negotiatee policy.

13. The networked system of claim 11, wherein the non-transitory memory includes a resource selected from a negotiation resource, policy resource, a delegation resource and combinations thereof.

14. A computer-implemented method comprising:

reviewing a negotiable service layer attribute received from a negotiatee;

sending a negotiation request to the negotiatee based upon the reviewed attribute;

receiving an offered suggestion from the negotiatee; and selecting the offered suggestion, wherein the negotiation request includes proposed suggestions indicating a way a service being negotiated with the negotiatee will be used, and wherein the offered suggestion is selected from the proposed suggestions based on one or more negotiation polices, and wherein each of the one or more negotiation policies includes one or more of common attributes, negotiation type, negotiator, negotiatee, service identifier, condition, and result.

15. The method of claim 14, wherein the received, offered suggestion is checked against predetermined negotiation policies of the negotiatee, and the negotiation request includes information selected from a service id, input for making suggestions, proposed suggestions and combinations thereof.

16. A computer-implemented method comprising:

receiving a policy for negotiating a negotiable service layer attribute from a negotiatee;

receiving a request from a negotiator to negotiate the attribute;

determining whether the request complies with predetermined criteria of the negotiatee policy; and sending an offered suggestion to the negotiator, wherein the negotiation request includes proposed suggestions indicating a way a service being negotiated with the negotiatee will be used, and wherein the offered suggestion is selected from the proposed suggestions based on one or more negotiation polices, and wherein each of the one or more negotiation policies includes one or more of common attributes, negotiation type, negotiator, negotiatee, service identifier, condition, and result.

17. The method of claim 16, further comprising:

receiving a negotiation confirmation from the negotiator; and sending an acknowledgment to the negotiatee of the negotiation confirmation.

18. A computer-implemented method comprising:

receiving a negotiation request for a negotiable service layer attribute from a negotiator;

locating a negotiatee having the attribute;

sending the negotiation request to the negotiatee; and receiving an offered suggestion from the negotiatee for the negotiable service, wherein the negotiation request includes proposed suggestions indicating a way a service being negotiated with the negotiatee will be used, and wherein the offered suggestion is selected from the proposed suggestions based on one or more negotiation polices, and wherein each of the one or more negotiation policies includes one or more of common attributes, negotiation type, negotiator, negotiatee, service identifier, condition, and result.

19. The method of claim 18, further comprising:

sending the offered suggestion to the negotiator;

receiving a negotiation confirmation from the negotiator; and sending an acknowledgment to the negotiatee of the negotiation confirmation.

* * * * *